United States Patent [19]

Ikeda

[11] Patent Number: 4,611,312
[45] Date of Patent: Sep. 9, 1986

[54] METHOD OF SEISMIC COLLECTION UTILIZING MULTICOMPONENT RECEIVERS

[75] Inventor: Keiichiro Ikeda, Placentia, Calif.

[73] Assignee: Chevron Research Company, San Francisco, Calif.

[21] Appl. No.: 465,070

[22] Filed: Feb. 9, 1983

[51] Int. Cl.$^4$ ............................ G01V 1/28; G01V 1/32
[52] U.S. Cl. ......................................... 367/38; 367/50; 367/74; 367/53; 364/421
[58] Field of Search ....................... 367/37, 38, 47, 50, 367/51, 52, 53, 73, 74; 364/421

[56] References Cited

U.S. PATENT DOCUMENTS 4,503,527  3/1985  Pann ....................................... 367/53

OTHER PUBLICATIONS

Rohde et al., "Migration of Time Contour Maps Using Downward Continuation", Technical Paper, 50th Annual Int. Meeting of SEG; (1980), pp. 337–373.
Kaila et al., "A New Computerized Method for Finding Effective Velocity, from reversed Reflection Travel time date" Geophysics, vol. 44, No. 6, Jun. (1979), pp. 1064–1076.

*Primary Examiner*—Salvatore Cangialosi
*Assistant Examiner*—Ian J. Lobo
*Attorney, Agent, or Firm*—H. D. Messner; Edward J. Keeling

[57] ABSTRACT

By using wave tracking rather than a downward continuation concept, two sets of elastic wave fields (one generated by a seismic source, the other recorded by multicomponent geophones) are migrated separately and are then imaged. The process is repeated for common shot gathers, and then the images (associated with each common midpoint gather), are stacked.

As a consequence of wave tracking, migration operations are preferably performed in the time domain using finite difference discretization equations involving vector properties of the fields but without having to reduce the latter to one-way wave equations. Result: the method of the present invention (i) easily handles reflectors of arbitrary dip angle;
(ii) handles interspatial elastic conversions;
(iii) eliminates multiples generated by known velocity contrasts;
(iv) takes account of different field source-receiver geometries;
(v) provides higher signal-to-noise ratio characteristics since a larger portion of wave energy is migrated than a conventional migration methods of which I am aware; and
(vi) has a symbiotic relationship when used with modern vector-based computing systems such as the Cray I, Cray Corporation, Minneapolis, Minn., based on the fact that since the fields themselves are defined by vector properties, operations are surprisingly rapid.

15 Claims, 14 Drawing Figures

FIG. 1.

METHOD OF SEISMIC COLLECTION UTILIZING MULTICOMPONENT RECEIVERS

SCOPE OF THE INVENTION

This invention relates to migration of seismic traces collected by multicomponent collection system and more particularly to time domain migration of at least two sets of resulting elastic wave fields in such a way that not only easily handles reflectors of arbitrary dip angle but also takes into account any P- to S-wave conversions (and vice versa) at such reflectors.

BACKGROUND OF THE INVENTION

Migration based on the one-way acoustic wave equation has the subject of several proposals, after the former was successfully introduced in the early 1970's [Claerbout, J., "Numerical Holography", *Acoustical Holography*, Vol. 3, A. F. Metherell, Ed., 273-283, Plenum Press, New York, 1970; and "Toward a Unified Theory of Reflector Mapping", *Geophysics*, 36, 467-481, 1971]. The most promising of these proposals included the following:

(i) F-K Migration Techniques
[Stolt, R. H., "Migration by Fourier Transform", *Geophysics*, 43, 23-48, 1978];

(ii) Kirchhoff Migration Systems
[Schneider, W. S., "Integral Equation Formulation For Migration in Two and Three Dimensions", *Geophysics*, 43, 49-76, 1978]; and (iii) Space-derivative Migration Techniques
[Gazdag, J., "Wave Equation Migration With the Accurate Space Derivative Method", *Geophysical Prospecting*, 28, 60-70, 1980].

Although each of the proposals, supra, has strengths and weaknesses (depending at least in part on the exploration situation and processing purpose), the methods in toto have at least two drawbacks, viz., (i) each is based on the theory of acoustic wave propagation, i.e. transference of P-waves only; and (ii) there is an assumption that the data had been stacked before migration occured, that is to say, it is assumed the reflector was not steep and the media velocity had been laterally constant. These assumptions are necessary to make data "source-receiver coincident" data so that the latter can be migrated without use of any particular imaging principles.

While the disadvantages, listed as items (i) and (ii) supra, can be overcome by using a migration before stacking technique (with imaging being based on the reciprocity theorem, after Schultz, P. S. and Sherwood, J. W. C., "Depth Migration Before Stack", *Geophysics*, 45, 376-393, 1980), the first-mentioned disadvantage has remained and has become even more of a problem with the advent of collection of seismic data using multicomponent receivers since the collected data contains both P- and S-wave data subject to conversion within the subsurface under survey.

While it has been recognized that elastic wave (rather than acoustic) migration offers the advantage of providing final results having higher signal-to-noise ratio characteristics (since a larger portion of wave energy would be migrated) none of the proposals of which I am aware have been successfully implemented using stable processing algorithms, have solved P- and S-wave couplings and conversions of dipping reflectors or utilized a wave tracking concept based on finite time differences between adjacent estimations.

In this regard I am aware of the following additional research that bears on the method of the present invention:

(i) a finite element migration proposal for multicomponent data that does not include wave tracking; and does not solve the problem posed by P- and S-wave conversions at dipping reflectors [Marfurt, K. J., "*Elastic Wave Equation Migration-inversion*", Ph.D. Thesis, Columbia University, 1978];

(ii) a Kirchhoff migration proposal for flat reflectors that does not include wave tracking; nor solve the problem of P- and S-wave conversion at dipping reflectors [Wang, M. Y. and Kuo, J. T., "Implementation of the Simple P and S Simultaneous Migration Method", Project MIDAS Annual Report II, 1-35, Columbia University, 1981]; and (iii) a one-way elastic wave inversion proposal for refraction and reflection data that, although providing velocity and scattering matrix information, does not include wave tracking; solve the problem of multicomponent receivers with P- and S-waves at dipping reflectors; nor compensate for lateral velocity changes. [Clayton, R. W., "Wavefield Inversion Methods for Refraction and Reflection Data", Ph.D. Thesis, Stanford University, 1981].

SUMMARY OF THE INVENTION

The present invention relates to a system for converting a seismic time section consisting of a plurality of amplitude v. time traces into a depth section consisting of a plurality of amplitude v. depth traces so that events on the time section are migrated both vertically and horizontally into position on said depth section corresponding to the actual spatial positions of the reflector in the subsurface irrespective of reflector dip, lateral velocity variation, or P- to S-wave conversion (or vice versa) in the subsurface, as well as without the need to undergo forward and inverse time-frequency transformations.

In accordance with the present invention, after-compensation for static effects has occurred, migration is first provided by sorting the source-receiver data into two sets for time-domain processing:

(i) one set relates to source signal as a function of horizontal coordinate and time $T_1, T_2 \ldots, T_L$;

(ii) the other set relates to groups of individual trace data associated with reception of the source signal of (i) at a series of receiver positions of known horizontal coordinate and time $T_1, T_2 \ldots, T_L$. Each receiver set is associated with a time slice $T_1, T_2 \ldots, T_L$ across the receiver group record; the dependent variable is amplitude of the recorded P- or S-wave energy.

Next, a computer memory can be partitioned into a series of $M \times N$-dimensional matrices each having $M \times N$ grid points representing depthwise a portion of said seismic depth section and identified with particular depth and horizontal coordinates. Beginning with source activation (the activation being of a predetermined or known character), full wave space-time reconstruction of the source wave can be achieved (after initializing the source wave) by tracking an elastic wave associated with an elastodynamic equation of wave propagation, as set forth below, down through the matrices, one-by-one, from the surface depth $z=0$ to some arbitrary depth $Z=z_L$ using a velocity model of predetermined character that has been carefully constructed to avoid multiples and to take into account lateral variations.

The reconstructed source elastic wave is stored on each matrix by indexing amplitude as a function of depth and horizontal coordinate on a point-by-point basis, with each matrix being associated with a given time step $T_1 \ldots T_L$.

Next, beginning with a time slice of one of the group of traces, say, at $t - T_o$, the maximum possible response time, e.g. where $t = 6$ seconds, similar full wave space-time reconstruction of the received elastic wave for the group is achieved (after initialization of the received group wave) by tracking the elastic wave associated with the same general equation down from the surface $z = 0$ to the same arbitrary depth using a similar velocity model. Assume use of a finite difference approximation of the full-wave elastodynamic equation of wave propagation (thus restricting the latter to time domain operations), the equation and initialization conditions for such determinations, would be as follows:

$$\frac{\phi_{i,j}^{n+1} - 2\phi_{i,j}^n + \phi_{i,j}^{n-1}}{\Delta t^2} = \frac{1}{\Delta h^2} [(\phi_{i+1,j}^n - 2\phi_{i,j}^n + \phi_{i-1,j}^n) + (\phi_{i,j+1}^n - 2\phi_{i,j} + \phi_{i,j-1})]$$

where $\phi$ is a scalar variable, i is the number of grid points in the x direction; j is the number of grid points in the z direction; n is the number of the time steps; $\Delta h$ is the spacing of the grid; and $\Delta t$ is the increment of time at each time step. In a typical forward-wave-propagation problem requiring the Dirichlet condition on the boundary, together with the Cauchy condition; i.e., the initial values and time derivatives at $t = 0$, the latter, in finite difference form, are expressed as:

$$\phi_{i,j}^n = f_{i,j}^n \mid i,j \text{ on a boundary}$$

$$\phi_{i,j}^n = g_{i,j} \mid n = 0$$

and $$\frac{\phi_{i,j}^{n+1} - \phi_{i,j}^n}{\Delta t} = h_{i,j} \mid n = 0$$

where $f_{i,j}^n$, $g_{i,j}$, and $h_{i,j}$ are specified beforehand as boundary or initial conditions.

The time derivative of the initial condition, sometimes not known in real situations, can be obtained numerically when finite difference approximations are used since the system is considered at rest before entry of the first signal. Note that in tracking the source and received P- and Sv-wave data down into the earth via the above-mentioned elastodynamic equation of wave propagation, that "time snapshots" of the wave at different time increments, say at time slices n, n+1, and n−1, are utilized. That is to say, solution of the elastodynamic equation at a particular time slice say step = n+1 depends not only on time and space solutions at that time slice but also on time and space derivatives at time steps of n and n−1. Hence, processing in accordance with present invention keyed to wave tracking, allows the wave fields observed at the earth's surface to be continuable in time in both forward and backward directions.

Finally, coherence between the forward migrated wave field (from the source(s)) and the backward migrated waves (from the receiver(s)), is determined. Basis of coherence: correlation tensor cross-products of the wave fields at each point of the partitioned matrices. Where a cross-product occurs, that product can be indexed to a given grid point and stored. Ultimately, all such stored products can be reordered as a function of sourcepoint-detector station coordinates and then stacked to form the final seismic depth section.

BRIEF DESCRIPTION OF THE DRAWINGS

FIGS. 3, 4 and 5 illustrate various aspects of frequency and time domain migration schemes, FIG. 3 being related to frequency domain one-way migration, while FIGS. 4 and 5 illustrate full-wave migration in accordance with the present invention;

DETAILED DESCRIPTION OF THE INVENTION

Figure 1:
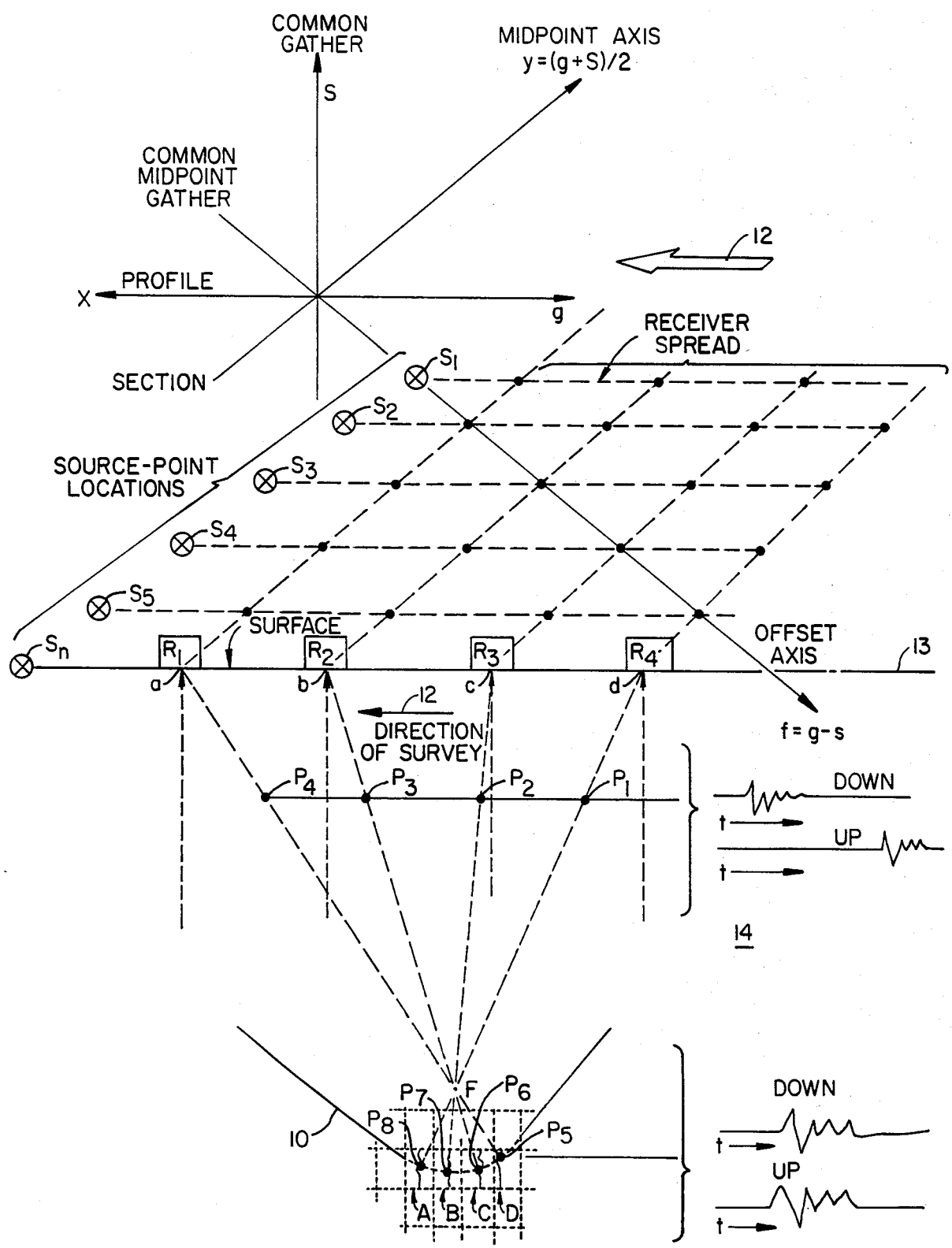
FIG. 1 is a partial section of an earth formation illustrating collection of seismic data in accordance with the present invention as well as how such collection steps relate to latter migration of such data.

Reference is now made to FIG. 1, in which is represented a single subsurface seismic reflector 10, that is concave upward in the zonelets A, B, C and D each defined by a series of grid points or raster of points. As a matter of interest, the reflector 10 of FIG. 1 is an idealized representation of a usual reflecting strata that occurs during seismic exploration, and that idealization is carried to the extent of associating highly curved part of the reflectors with zonelets A, B, C and D and a center of curvature, or focus, F.

Assume that a conventional common depth point (CDP) collection system (not shown) had surveyed the earth formation that includes the reflector 10 in classical redundant fashion. Direction of survey: along arrow 12. A source of seismic energy (usually of either compressional or shear orientation) is placed at positions S1 ... Sn in sequence. Energy output of each source at each position S1 ... Sn, is redundant as to amplitude v. time and amplitude v. frequency spectra. After each source has been activated, a series of traces (called a profile) is generated at a series of receiver stations identified by sourcepoint-receiver station coordinates along the line of survey. That is to say, after activation of each source, a series of traces called a profile, are recorded at receivers R1 ... R4. Whereas the simple reflector 10 can be considered from the standpoint of a single source or shot location, in actual practice a series of profiles are generated separately by many shots and receiver sets so that each position is sampled many times. In usual collection operations, the source positions S1 . . . S5 are colinear with line of survey 13. The receivers R1 . . . R4 are positioned as shown along the same line. Ideally all the seismic waves of interest propagate in a plane through the line of survey, called the plane of the seismic section.

Seismologists do not describe interpretations in terms of a single source shooting into a single set of receivers. Hence, it is important to identify important relationships between the two most common coordinate systems used in CDP collection: (i) displays of traces in accordance with sourcepoint (s) and receiver (g) coordinates, and (ii) displays of traces in accordance with offset (f) and midpoint (y) coordinates.

Reflections obtained at the receiver positions $R_1$ . . . $R_4$ are schematically illustrated in FIG. 1 and can be described in terms of source and receiver coordinates (s) and (g), the latter two being taken as independent variables, as is time t. The origin point on the time axis is chosen so that time t=0 when the source is activated. In FIG. 1 the time axis is perpendicular to the plane of the page.

Both (s,g) and (y,f) coordinates are seen in FIG. 1 to be orthogonal to each other. A display over midpoint y at a fixed offset f, i.e., the (y,t) plane, is called a seismic section and is the only one of the orthogonal planes that is continuous along the line of survey. Displays in the (f,t) plane is called a common midpoint gather or, unfortunately, a common depth point gather. The latter term originated in the days when seismic methods modeled the earth as a stratified flat medium in the reflection point, and the midpoint was projected to an imaginary (in many instances erroneous position) on the reflector. Profiles typically contain 48 to 96 traces, called a record, continue for only a few miles associated with receiver spread length and the lateral distance over which a shot can be received.

While trace and source terms associated with the elastodynamic equation of full-wave propagation can be transformed from source and receiver (s) and (g) coordinates into offset-midpoint coordinates (see e.g., page 240 et seq of J. F. Claerbout's book "Fundamental of Geophysical Data Processing" 1976 McGraw-Hill), not so in the present invention. Source and receiver coordinates, viz., (s) and (g) values, for both source and trace terms of the above-identified equation, are retained.

Imaging of subsurface reflectors is another important aspect of the present invention. Reflectors such as reflector 10 are imaged in this invention using a principle of time coincidence of downgoing and upcoming elastic waves. The principle is illustrated in FIG. 1 in conjunction with wave action at subsurface points P1–P8 within the subsurface earth formation 14.

Imagine a series of surface sources, alternately placed at positions $R_1$ . . . $R_4$ all coplanar with the line of survey 13.

At subsurface points P1–P4 in formation 14 horizontally aligned as shown, the downgoing waves (D) originating at points a–d at the earth's surface, occur much earlier in time than the upcoming wave (U). That is, the energy which has traveled directly from a source at location $S_n$ to points P1–P4 arrives at the latter positions so much quicker that energy upcoming from the reflector 10. However, at the horizontally aligned points P5–P8, there is an overlap in time of the down- and upgoing waves (D) and (U); the time overlap forms the imaging principle used in the instant application for mapping reflector 10 even though the latter positions of the reflector is sometimes difficult to ascertain from the received traces, i.e., to say reflectors exist in the formation 14 at places where the onset of the downgoing wave is time coincident with the upgoing wave.

Figure 2:
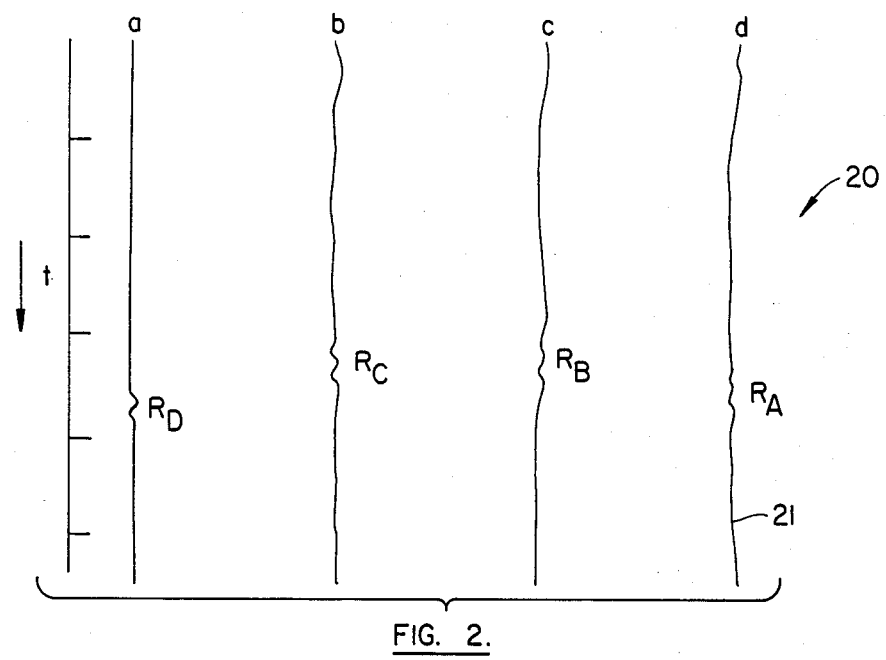
FIG. 2 is a time record associated with the collection of seismic data from a concave reflector in the formation of FIG. 1.

But since the response time is proportional to travel path, a side-by-side display 20 of the receiver traces of positions a . . . d will appear as shown in FIG. 2. That is to say, the reflected wave from reflector segment A, for instance, travels through the focus F toward the receiver in the neighborhood of point d, and it will appear as event R4 on trace 21 of the display 20 under point d at a time porportional to the path length from the reflector segment to point d. Note that FIG. 1 shows the reflector 10 at its actual depth while in the time display 20 of FIG. 2, the display 20 shows the reflection at a position determined by the velocity function assumed for the formation. Another feature of the set of reflections events $R_A$, $R_B$, $R_C$ and $R_D$ of the record 20 is that on a time section they form a group that is concave downward instead of concave upward as is the reflector of their origin. It is also noteworthy that the part of the reflector in zonelets A, B, C and D of FIG. 1 manifested in seismic signals in FIG. 2 is spread over a much larger horizontal distance than is that part of the reflector itself.

In the present invention, gathered data on the time section is related to them back to the subsurface locations of their origin using full-wave migration of source and receiver signals. If the time display 20 contained only a few simple data as shown in FIG. 2, the solution would be easy and obvious. The construction of a cross-section of reflectivity within the earth from a seismic record would consist of just applying a proportionality factor to the time axis. Even with a dipping reflector, the reflection event $R_A$ of FIG. 2 shows a definite "moveout"; i.e., among the geophones in the neighborhood of point d, the left-hand geophone received the signal before the right-hand geophones. Obviously then, the reflection came from below and to the left at an angle indicated by an angle and at a distance equal to half the time of receipt on the time section multiplied by the seismic velocity. Similar reasoning would apply to reflections $R_B$, $R_C$ and $R_D$.

As simple as is the FIG. 1, the fundamental mathematical difficulty of the migration of seismic records is indicated. The migration process is not just a "mapping" process in which each point on the time section corresponds to a point on the depth section, so that an event appearing at a time section just needs to be transferred to its corresponding depth section point. In the migration process, an event appearing at the time section may need to be transferred leftward or rightward depending on what direction is the extent of movement being indicated by the type of reinforcement which that event receives from neighboring traces. More precisely, each event must be separated into a number of components, according to the various reinforcements it receives from its neighbors, as wll as the dip of the reflector, and these components must be transferred to various, perhaps widely-spaced, locations proportional to a relating function of the earth strata. In many applications, the seismic velocity, v, of the propagation of seismic waves through the earth, is taken in the migration process to be constant. Actually, in most cases of practical significance, the seismic velocity tends to increase with depth. Also, where the product of the seismic velocity and the formation density changes rather abruptly at certain subsurface interfaces usable seismic reflections are manifested as events in the individual traces of the seismic record. The complication of varying the velocity as a function of the vertical and horizontal spatial coordinates are a particular attribute of migration in accordance with the present invention, eliminative multiples generated by such contrasts. It will be apparent to skilled seismologists how vertical and horizontal velocity complications will add to the steps to be described. In the first part of the discussion, wave paths will be shown as straight lines. It is well known that vertical velocity variation causes such paths to become curves whose departure from verticality increases with depth. The dip angles of the reflectors and angles with which seismic waves are received at the surface, will in the more realistic case, become unequal and greater, i.e. are exaggerated. For example, if a vertical reflector is dipping (from horizontal), say, where its apparent dip as indicated by moveout is about 45°, really that reflector has only an actual slope of 9°. In the general case, wave paths are not describable by simple mathematical expressions. However, skilled seismologists will recognize that the essential elements of the present remained unchanged by necessary elaborations other than those set forth below.

I have found that the migration process may be carried out, using presently available computing apparatus of reasonable complexity, and using presently available recording materials, if the migration is performed in three overall steps as follows: the original source and receiver data, are sorted into two sets: source data and receiver information. The source data set is assumed to be redundant from sourcepoint coordinate to sourcepoint coordinate. If a vibratory source is used, only the pilot signal is retained. If an impulsive source is used, redundant amplitude and frequency spectra characteristics must be maintained in a similar fashion.

Each receiver data set, on the other hand, is processed by generating a series of time slices T1,T2 ... T1 across each receiver data set normalized to a common sourcepoint coordinate, after normal static corrections have been made. After a computer memory has been partitioned into a series of matrices each further subdivided into a series of grid points describing depthwise, the final depth section, reconstruction of elastic wave fields is achieved by tracking each wave field associated with the full wave elastodynamic wave propagation down through the series of matrices, using a wave tracking incremental stepped sequence of operations. It occurs after the source and receiver data have been initialized.

The reconstructed elastic fields are stored on each matrix at the correct grid point locations, the latter also being indexed to a particular time $T_1 \ldots T_o$ normalized to activation of the source.

Lastly coherence, if any, between the series of source-receiver matrices is determined. Basis of such determination: the degree of correlation between the source and receiver wave fields on a point-by-point basis over each M×N matrix. Where a match occurs, the correlation amplitude is stored as a function of the matrix grid coordinates. Ultimately, all such amplitudes are plotted on composite matrix representing depthwise the seismic depth section identified by particular depth and horizontal (source-receiver) coordinates.

Thus far the terms "elastodynamic equation of wave propagation" and "elastodynamic equations of wave propagation" have been mentioned several times and reference is now made to development of the theoretical bases underlying the present invention.

Elastodynamic Equation(s) of Wave Propagation

The equations for elasticity and balance are:

$$\sigma_{xx} = (\lambda + 2\mu)\frac{\partial u}{\partial x} + \lambda \frac{\partial v}{\partial y} \tag{1}$$

$$\sigma_{yy} = (\lambda + 2\mu)\frac{\partial v}{\partial y} + \lambda \frac{\partial u}{\partial x} \tag{2}$$

$$\sigma_{xy} = \mu \left( \frac{\partial v}{\partial x} + \frac{\partial u}{\partial y} \right) \tag{3}$$

$$\rho \frac{\partial^2 u}{\partial t^2} = \frac{\partial \sigma_{xx}}{\partial x} + \frac{\partial \sigma_{xy}}{\partial y} \tag{4}$$

$$\rho \frac{\partial^2 v}{\partial t^2} = \frac{\partial \sigma_{xy}}{\partial x} + \frac{\partial \sigma_{yy}}{\partial y} \tag{5}$$

where u is the horizontal component of a displacement vector; v is the vertical component of a displacement vector; $\sigma_{ij}$ is a component of a stress tensor; $\lambda$ is Lame's parameter; $\mu$ is another Lame's parameter; $\rho$ is density; x is a horizontal coordinate, and y is a vertical coordinate. Lame's parameters and the density are assumed to be dependent variables of spatial coordinates x and y. Therefore, Equations 1 to 5 are applicable to isotope elastic media that are arbitrarily inhomogeneous.

Substituting Equations 1, 2 and 3 into Equations 4 and 5, lead to Navier's equations for inhomogeneous isotropic media:

$$\rho \frac{\partial^2 u}{\partial t^2} = \frac{\partial}{\partial x}\left[(\lambda + 2\mu)\frac{\partial u}{\partial y} + \lambda \frac{\partial v}{\partial y}\right] + \tag{6}$$

$$\frac{\partial}{\partial y}\left[\mu\left(\frac{\partial v}{\partial x} + \frac{\partial u}{\partial y}\right)\right]$$

and $$\rho \frac{\partial^2 v}{\partial t^2} = \frac{\partial}{\partial x}\left[\mu\left(\frac{\partial v}{\partial x} + \frac{\partial u}{\partial y}\right)\right] + \tag{7}$$

$$\frac{\partial}{\partial y}\left[(\lambda + 2\mu)\frac{\partial v}{\partial y} + \lambda \frac{\partial u}{\partial x}\right]$$

Expanding these equations, $$\rho \frac{\partial^2 u}{\partial t^2} = \left[\left(\frac{\partial \lambda}{\partial x} + 2\frac{\partial \mu}{\partial y}\right)\frac{\partial u}{\partial y} + \frac{\partial \lambda}{\partial x} \cdot \frac{\partial v}{\partial y} + \right. \tag{8}$$

$$\left. \frac{\partial \mu}{\partial y} \cdot \frac{\partial v}{\partial x} + \frac{\partial \lambda}{\partial y} \cdot \frac{\partial u}{\partial y}\right] + \left[(\lambda + 2\mu)\frac{\partial^2 u}{\partial x^2} + \right.$$

$$\left. (\lambda + \partial)\frac{\partial^2 v}{\partial x \partial y} + \frac{\partial^2 u}{\partial y^2}\right]$$

and $$\rho \frac{\partial^2 v}{\partial t^2} = \left[ \frac{\partial \mu}{\partial x} \cdot \frac{\partial x}{\partial x} + \frac{\partial \mu}{\partial x} \cdot \frac{\partial u}{\partial y} + \right. \tag{9}$$

$$\left( \frac{\partial \lambda}{\partial y} + 2 \frac{\partial \mu}{\partial y} \right) \frac{\partial v}{\partial y} + \frac{\partial \lambda}{\partial x} \right] + \left[ (\lambda + 2\mu) \frac{\partial^2 v}{\partial y^2} + \right.$$

$$\left. (\lambda + \mu) \frac{\partial^2 u}{\partial x \partial y} + \mu \frac{\partial^2 v}{\partial x^2} \right]$$

If the spatial derivatives of Lame's parameters are assumed to be negligible, terms in the first parentheses on the right-hand sides of Equations 8 and 9 can be dropped. The validity of this assumption depends on the medium to be dealt with, but experience from acoustic wave migration suggests that this assumption is, in general, acceptable. The result is Navier's equation with variable P- and S-wave velocities:

$$\frac{\partial^2 v}{\partial t^2} = \alpha^2 \frac{\partial^2 u}{\partial x^2} + (\alpha^2 - \beta^2) \frac{\partial^2 v}{\partial x \partial y} + \beta^2 \frac{\partial^2 u}{\partial y^2} \tag{10}$$

and $$\frac{\partial^2 v}{\partial t^2} = \alpha^2 \frac{\partial^2 v}{\partial y^2} + (\alpha^2 - \beta^2) \frac{\partial^2 u}{\partial x \partial y} + \beta^2 \frac{\partial^2 v}{\partial x^2} \tag{11}$$

in which $$\alpha = \sqrt{\frac{\lambda(x,y) + 2\partial(x,y)}{\rho(x,y)}} = \text{wave Velocity} \tag{12}$$

and $$\beta = \sqrt{\frac{\mu(x,y)}{\rho(x,y)}} = \text{S-wave Velocity} \tag{13}$$

Equations 10 through 13, the governing equations for the propagation of elastic waves in a medium with arbitrarily variable velocity, provide a starting point for elastic wave migration.

CONTINUATION OF WAVE FIELDS

Migration of elastic wave fields observed at the surface of earth using seismic data collected in the field, is recognized by theoreticians as a classical continuation problem in which the real field wave data comprises a continuum in horizontal and time coordinates and backscattered data are arranged as if they were originated by exploding reflectors at one particular time. Migration by wave equation solution is divided into categories depending on whether or not the computations are done in the frequency or time domain.

In the frequency domain downward continuation solutions of elastic wave migration starts with the basic wave equation:

$$\frac{\partial^2 \phi}{\partial t^2} - \left( \frac{\partial^2 \phi}{\partial x^2} + \frac{\partial^2 \phi}{\partial z^2} \right) = 0 \tag{14}$$

where $\phi$ is a scalar variable; x relates to the horizontal coordinate axis; and z to the vertical coordinate axis.

Taking the Fourier transform of t, i.e., $\theta(\omega) = \int \theta(t) \rho^{-2\pi i \omega t} dt$, the Helmholtz equation results in:

$$\frac{\partial^2 \phi}{\partial x^2} + \left( \frac{\partial^2 \phi}{\partial z^2} + \omega^2 \phi \right) = 0 \tag{15}$$

where $\omega$ is frequency.

Because the Helmholtz equation is a partial differential equation of elliptic type, a unique solution requires specificity of certain conditions over the entire boundary, called the Dirichlet condition or Neuman condition, or else the solution becomes non-unique and unstable. Unfortunately, this boundary condition is not satisfied generally in exploration seismology because data is observed on only a part of the boundary, i.e., the surface of the earth. One remedy would be to reformulate the Helmholtz equation as an initial-value problem, but that is known to give an unstable solution in general. Although there are many methods for stabilizing this solution, the easiest and the most robust way is to drop the higher-order derivative in the z direction. The first-order differential operator in this direction can be solved stably by specifying the Dirichlet condition on part of the boundary only, i.e., the surface of the earth, resulting in migration via the downward-continuation concept, see Claerbout, op. cit.

Figure 3:
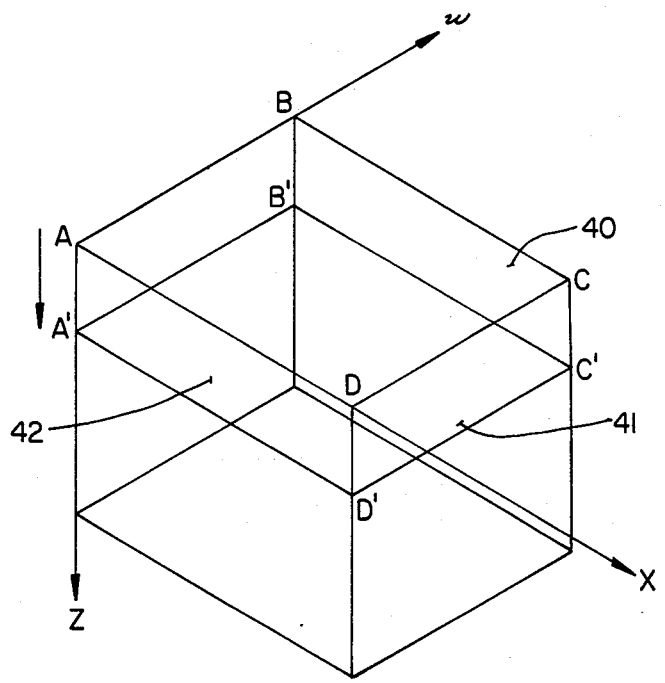

FIG. 3 schematically illustrates Claerbout's concept in detail.

As shown, data specified on an x-w plane 40, are continued downward to a new plane 41. Results of this calculation after being transformed back to the time domain, give the required migrated depth section on x-z plane 42.

Although using Claerbout's one-way wave equation formulation of FIG. 3 for migration has many attractive features, such as high resolution along the vertical axis and numerical stability, its accuracy declines quickly for steeply dipping reflectors, structures with highly variable velocities, data contaminated severely by multiples due to velocity contrasts, and widely separated source-receiver geometries. In such situations, there is a need to formulate wave equation migration based on the full-wave elastodynamic equation or equations of wave propagation. For reasons hereinafter set forth, it is essential that time domain solutions be utilized.

In accordance with the present invention, the formulation for the full-wave elastodynamic equation relies on the fact that a differential operator of hyperbolic type can work backward as well as forward in time under appropriate boundary and initial conditions. This becomes clear when a finite difference approximation is used for the differential operator, so that Equation (1) becomes $$\frac{\phi_{i,j}^{n+1} - 2\phi_{i,j}^n + \phi_{i,j}^{n-1}}{\Delta t^2} - \frac{1}{\Delta h^2} [(\phi_{i+1,j}^n - 2\phi_{i,j}^n + \phi_{i-1,j}^n) + \tag{16}$$

$$\phi_{i,j+1}^n - 2\phi_{i,j}^n + \phi_{i,j-1}^n)] = 0$$

where:
$\phi$ = a scalar variable;
i = a number of grid points in the x direction;
j = a number of grid points in the z direction;
n = a number of a series of time steps or matrices;

Δh=a grid spacing; and
Δt=an increment of time at each time step.

A typical forward wave propagation problem requires the Dirichlet condition on the boundary, together with the Cauchy condition, i.e., the initial values and time derivatives at t=0. In the finite difference form these are expressed as:

$$\phi_{i,j}^n = f_{i,j}^n \qquad | \; i,j \text{ on a boundary} \qquad (17)$$

$$\phi_{i,j}^n = g_{i,j}^n \qquad | \; n = 0 \qquad (18)$$

$$\phi_{i,j}^{n+1} - \phi_{i,j}^n = h_{i,j}^n \qquad | \; n = 0 \qquad (19)$$

where $f^n_{i,j}$, $g^n_{i,j}$, and $h^n_{i,j}$ are specified beforehand as boundary or initial conditions.

Using finite difference approximations as in Equations (16) to (19), the consideration for the Cauchy condition becomes simpler because a system is normally considered at rest before entry of the first signal, and to obtain solutions at time step n+1 in Equation (16) requires the data at time steps n and n−1 only.

In other words, the time derivate for the Cauchy condition need not be explicitly calculated if use is made of the finite difference approximations of the elastodynamic equation in the time domain.

Note that in tracking the elastic field associated with the source and received P- and SV-wave data down into the earth via the above-mentioned elastodynamic equation of wave propagation, that "time snapshots" of the wave at different time increments, say at time slices n, n+1, and n−1, are utilized. That is to say, solution of the elastodynamic equation at a particular time slice, say step=n+1, depends not only on time and space solutions at that time slice, but also on time and space derivatives at time steps of n and n−1. Hence, processing in accordance with present invention keyed to wave tracking, allows the wave field observed at the earth's surface to be continuable in time in both forward and backward directions.

Figure 4:
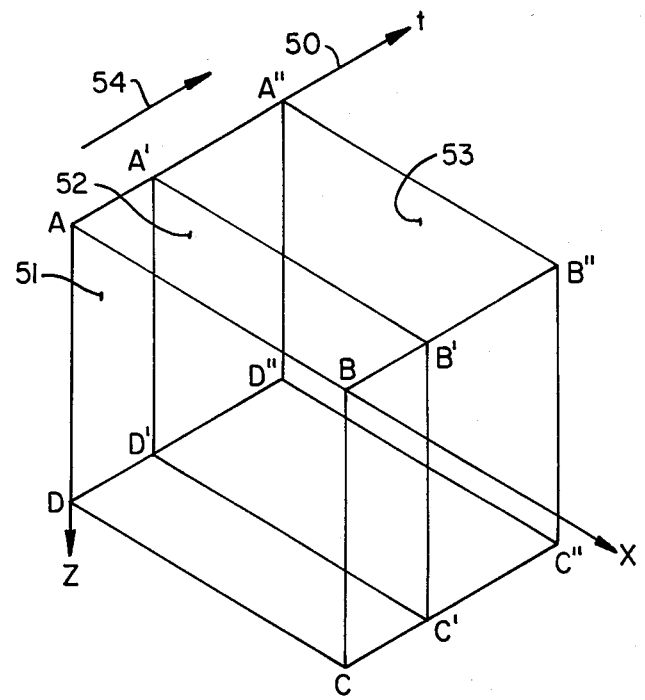
Figure 5:
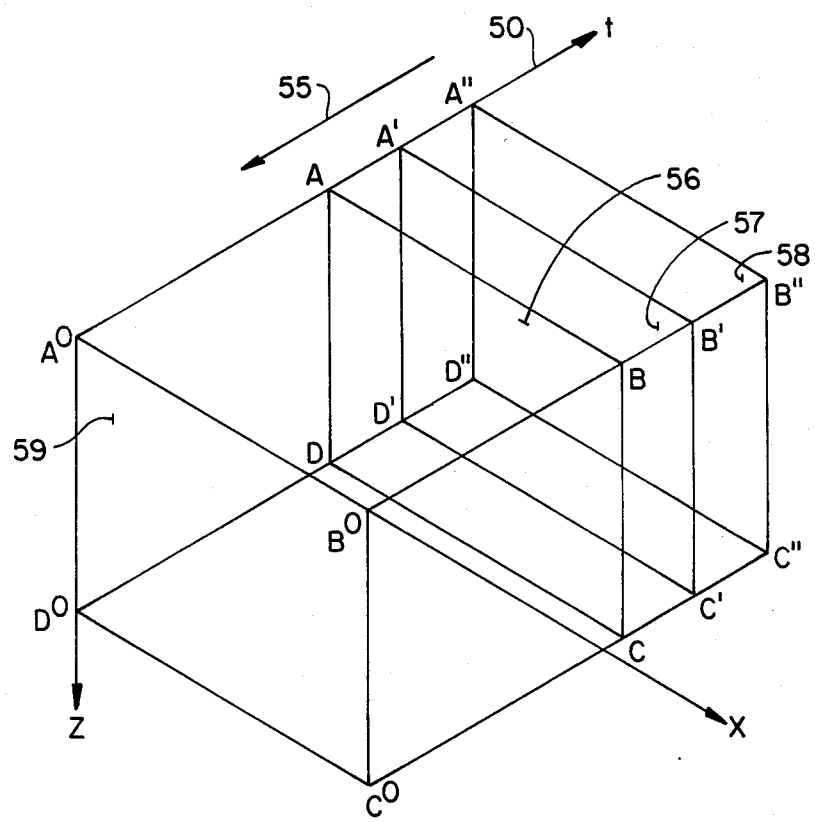

FIGS. 4 and 5 illustrate in schematic form use of a "wave-tracking" approximation for solution of the full-wave elastodynamic equation in the time domain, in accordance with the present invention.

As shown to obtain the solution of the wave equation along the time axis 50, only two consecutive field values need be calculated, i.e., only two "snapshots" of solutions along the time axis 50 are required. As shown in FIG. 4 two known wave fields are schematically illustrated as planes 51 and 52, and they can be "tracked" to a new wave field 53 in the forward time direction parallel to arrow 54. The causality principle allows the assumption of homogeneous (i.e., zero) boundary conditions except at the surface of the earth. Therefore, until a wave arrives at those boundaries, this "wave-tracking" formulation gives correct solutions.

FIG. 5 illustrates also a schematic form, use of the "wave-tracking" approximation for solution of the full-wave elastodynamic equation in a back-tracking mode, i.e. in the direction of arrow 55, "backward" along the time axis 50.

Such use is based on the fact that from Equation (3) supra, the n−1 wave field can be constructed if wave fields n and n+1 are completely known. However, complete knowledge of wave fields is not generally available because observations are made only at the surface of the earth. But if boundary conditions remain homogeneous and the system eventually returns to its initial (at rest) state, then initialization conditions are satisfied in accordance with the present invention.

Note in FIG. 5 that the n−1 wave field 56 is tracked by using the n and n+1 wave fields 57, 58, respectively. When the data are stacked before migration, they can be backward-tracked to obtain the original wave field 59 at time zero. But because of the linearity of the system, the above assumption causes loss of contributions from those unattainable boundaries and previous states. But these are minor when considered in relationship to the increase in data acquisition costs required to remedy the aforementioned loss in resolution, especially if the finite difference approximation of the solutions allows evaluation of converted elastic waves at the boundaries of interest.

THE IMAGING PRINCIPLE

Although the stacking of recorded data is one of the most important inventions in exploration geophysics, this technique provides only limited results if velocities in a medium change laterally within a short distance. Then the migration of stacked data gives erroneous results even if the method can handle such laterally inhomogeneous media. Also, since the present invention comtemplates collection systems that use either P-wave or S-wave sources in conjunction with multicomponent receivers, its prerequisite ability to handle migration of both P- and S-elastic waves as well as distinguish the generation of converted P- to S-wave (or vice versa) conversion at the boundaries of interest, is paramount. This also dictates that time domain processing be used as explained below.

While the reciprocity theorem is widely used for imaging unstacked migrated data (Schultz and Sherwood, op. cit.) that method has particular applicability to acoustic wave fields. However, where elastic fields are involved as in the method of the present method, the vector property of the latter dictates that time-coincident imaging be used. That is to say, since the time-coincident imaging principle (which states that the reflectors are located where waves moving upward and downward are time-coincident, see FIG. 1) is always operative especially where elastic wave conversions must be accounted for, it is preferred in operations in accordance with the present invention.

Instead of migrating source and receiver pairs alternatively as has been done previously in Schultz op. cit., fields in the present invention, generated by sources and wave fields recorded by receivers, are separately migrated. Correlations are then taken between these two sets of wave fields at each time step.

Figure 6:
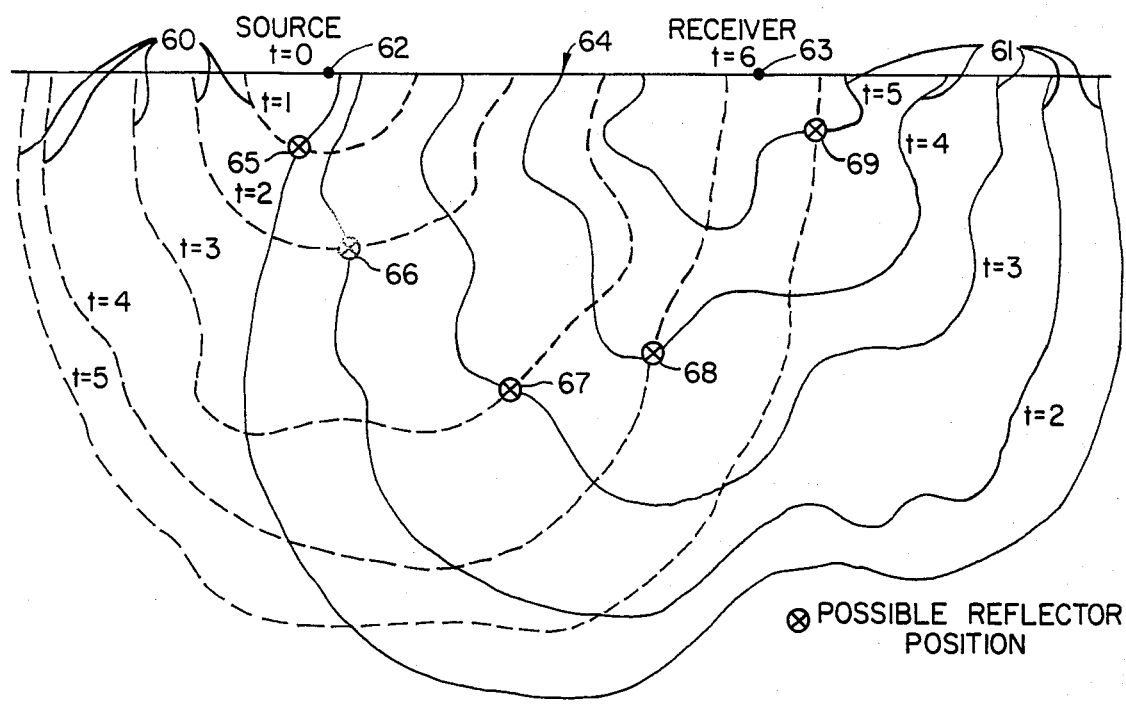
FIG. 6 is a schematic side elevation of an earth formation illustrating wave front propagation from a source to a single receiver and vice versa in accordance with wave track reconstruction by the principles of the present invention.

FIG. 6 illustrates the imaging process in detail.

As shown, wave fields 60, 61 are seen originating at source point 62 and receiver location 63, respectively, at the earth's surface 64. Purpose of depicted field travel to show that the reflectors 65–69 in a medium of arbitrarily variable velocity occur at time coincidence of the up- and down-going waves. Since this imaging is carried out in the time domain, the wave-tracking method of migration in accordance with the present invention provides a superior computation scheme. That is to say, FIG. 6 shows that reflectors 65–69 exist where the two wave fields 60, 61 are time coincident but are independent of preselected field coordinates for each source-receiver pair. From such result, positions of the reflectors 65–69 can be determined, taking into account actual sourcepoint receiver geometries.

Correlations can easily be calculated between two wave fields, $\phi_S$ and $\phi_R$, at each time slice in the time domain in accordance with $$\text{Image}(x,y) = \sum_{t=0}^{T_o} \phi_S(x,y,t) \otimes \phi_R(x,y, T_o - t) \tag{20}$$

where $\phi_S$ and $\phi_R$ are tracked wave field waves for source or receivers, respectively; $T_o$ is the time at which the system returns to rest, the symbol $\otimes$ denotes a correlation operator, and x, y are field coordinates. The correlation process is preferably used without usual normalization to avoid unnecessary correlations to noise and preserve the amplitude contrasts in the image.

Figure 7:
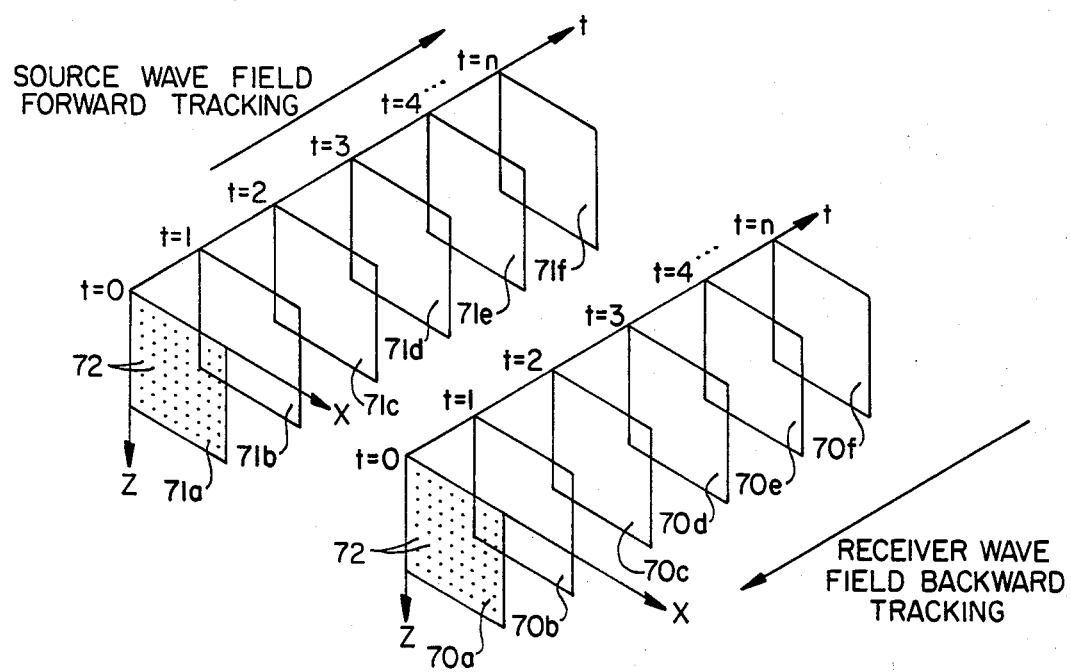
FIG. 7 illustrates, in schematic form, processing steps for obtaining indications of reflectors associated with the earth formation of FIG. 6.

FIG. 7 illustrates the manner in which the forward- and backward tracked fields 60, 61 of FIG. 6 can be correlated (i.e. imaged) to provide indications of the reflector locations schematically shown at reflectors 65–69 of FIG. 6.

As shown in FIG. 7, the receiver and source traces are divided into two sets of time matrices: a first set 70a, 70b ... 70f; and a second set 71a, 71b ... 71f, respectively. Each matrix is 2-dimensional so as to define a series of common column and row lines (not shown) associated with similar horizontal and depth coordinates. The intersection of such lines form a grid of points 72, as shown.

Correlation between the tracked wave fields (and imaging of the reflectors 65–69 of FIG. 6) is provided by cross-productization of the trace information stored on each matrix on a point-by-point basis. For example, the data stored on matrix 71a is cross-product with information on matrix 70a, on a point-by-point basis. Where a cross-product results, those products are stored as a function of particular horizontal and depth coordinates.

Of course, the imaging steps can also be reformated for each common shot-receiver pair of each profile and then those results re-indexed as a function of common depth point gather coordinates so that the final images can be enhanced by stacking, if desired. Since reformattig is easily achieved in the time domain, the method of the present invention can easily be adjusted to so as to handle irregular source-receiver geometries, as required, see FIG. 1.

It should also be obvious to one skilled in the art, especially from the above discussion, that the present invention contemplates use with both P-wave and S-wave sources as well as reception of both P-wave and S-wave fields at the receivers. In the case of such receivers comprising multicomponent units, the reception of both P- and S-wave components (even though only a unimode source is used) has been found to be surprisingly apt to occur. The latter results from P- to S-wave conversion of the source wave field at boundaries of interest.

In order for the method of the present invention to adjust for all of the above variable circumstances, the elastodynamic equation of interest must be augmented for use in P-wave and S-wave environments. In the time domain, a finite-difference discretization of the time derivatives gives a convenient tracking scheme that works backward as well as forward. However, for discretizing spatial derivatives many options, including the finite difference methods, the finite element method, and the Fourier (Pseudo-spectral) method, are available while these methods give more or less the same result, finite difference discretization is preferred because of its simplicity in implementation within computer-dominated processes.

Discretizing the Navier equations (i.e., Equations 10 through 13) by the finite difference method, provides:

$$\frac{U_{i,j}^{n+1} - 2 U_{i,j}^n + U_{i,j}^{n-1}}{\Delta t^2} = \alpha_{i,j}^2 \left( \frac{U_{i+1,j}^n - 2 U_{i,j}^n + U_{i-1,j}^n}{\Delta h^2} \right) + \tag{21}$$

$$(\alpha_{i,j}^2 - \beta_{i,j}^2) \left( \frac{V_{i+1,j+1}^n + V_{i-1,j-1}^n - V_{i-1,j}^n - V_{i,j-1}^n}{\Delta h^2} \right) +$$

$$\beta_{i,j}^2 \left( \frac{U_{i,j+1}^n - 2 U_{i,j}^n + U_{i,j-1}^n}{\Delta h^2} \right)$$

$$\frac{V_{i,j}^{n+1} - 2 V_{i,j}^n + V_{i,j}^{n-1}}{\Delta t^2} = \alpha_{i,j}^2 \left( \frac{V_{i,j+1} - 2 V_{i,j-1}^n + V_{i,j-1}^n}{\Delta h^2} \right) + \tag{22}$$

$$(\alpha_{i,j}^2 - \beta_{i,j}^2) \left( \frac{U_{i+1,j}^n + U_{i,j+1}^n - U_{i-1,j}^n - U_{i,j-1}^n}{\Delta h^2} \right) +$$

$$\beta_{i,j}^2 \left( \frac{V_{i+1,j}^n - 2 V_{i,j}^n + V_{i-1,j}^n}{\Delta h^2} \right)$$

$$\alpha_{i,j} = \sqrt{\frac{\lambda_{i,j} + 2 \mu_{i,j}}{\rho_{i,j}}} = P\text{-wave Velocity} \tag{23}$$

and $$\beta_{ij} = \sqrt{\frac{\mu_{i,j}}{\rho_{i,j}}} = S\text{-wave Velocity} \tag{24}$$

In the finite difference forms, boundary conditions and initial conditions for forward wave tracking are $$U_{i,j}^n = V_{i,j}^n = 0 \quad | \ i,j \text{ on the boundaries other than the surface} \tag{25}$$

$$U_{i,j}^n = V_{i,j}^n = 0 \quad | \ n < 0 \tag{26}$$

$$U_{i,j}^n = f_{i,j}^n \quad | \ n \geq 0, \ i,j \text{ on the surface} \tag{27}$$

$$V_{i,j}^n = g_{i,j}^n \quad | \ n \geq 0, \ i,j \text{ on the surface} \tag{28}$$

and for backward wave tracking, they are $$U_{i,j}^n = V_{i,j}^n = 0 \quad | \ i,j \text{ on the boundaries other than the surface} \tag{29}$$

$$U_{i,j}^n = V_{i,j}^n = 0 \quad | \ n > T_o \tag{30}$$

$$U_{i,j}^n = f_{i,j}^n \quad | \ n \leq T_o, \ i,j \text{ on the surface} \tag{31}$$

$$V_{i,j}^n = g_{i,j}^n \quad | \ n \leq T_o, \ i,j \text{ on the surface} \tag{32}$$

In forward tracking, f and g represent data generated by sources; in backward tracking they represent data sensed by receivers.

For imaging, $$\text{Image}(x, y) = \sum_{t=0}^{T_o} U_S(x, y, t) U_R(x, y, T_o - t) + \qquad (33)$$

$$\sum_{t=0}^{T_o} U_S(x, y, t) V_R(x, y, T_o - t) +$$

$$\sum_{t=0}^{T_o} V_S(x, y, t) U_R(x, y, T_o - t) +$$

$$\sum_{t=0}^{T_o} V_S(x, y, t) V_R(x, y, T_o - t)$$

where:

$T_o$ is the time at which the last record is observed;
$\Delta t$ is the incremental time step;
$\Delta h$ is the grid point distance;
$U_S$ is a horizontal component of the source, or so-called S-wave displacement vector;
x is a horizontal coordinate;
Z and y are the vertical coordinate;
$U_R$ is a horizontal component of the receiver, or so-called S-wave displacement vector;
$V_S$ is a vertical component of source displacement, or so-called P-wave displacement vector;
$V_R$ is a vertical component of the receiver, or so-called P-wave displacement vector;
$\alpha$ is the P-wave Velocity;
$\beta$ is the S-wave Velocity;

$$\left. \begin{array}{c} \lambda \\ \mu \end{array} \right\}$$

are Lame's parameters;
$\rho$ is the density.

Note, in solving for elastic wave fields associated with the previously mentioned elastodynamic equation that now has been augmented for use in P-wave and S-wave environments, i.e., Equation (21) to Equation (32), that the Cauchy data for the time derivative and the Dirichlet or the Neuman condition for the spatial derivative, are again used. As previously described, surprisingly the Cauchy data (for the forward wave propagation case) are provided by assuming that the system is at rest at the time before t=0 and that the first data are applied at t=0 at the boundary. In other words explicit calculations of the time derivative is unneeded for the former condition if the finite difference approximation outlined above is used. The Dirichlet condition is satisfied by assuming that the remaining boundaries are rigid. Then, if the elastic fields associated with the elastodynamic equations of wave propagation in P-wave and S-wave environments are tracked along the time axis for consecutive values of the displacement vector only two snapshots are needed to determine the resultant field. For the backward wave propagation, the Cauchy data are provided by assuming that the system returns to rest again at t=n+1, i.e. that the last wave train passes at t=n. The Dirichlet condition is specified at each time step as receiver data obtained at the surface and in the same manner previously described.

Figure 8:
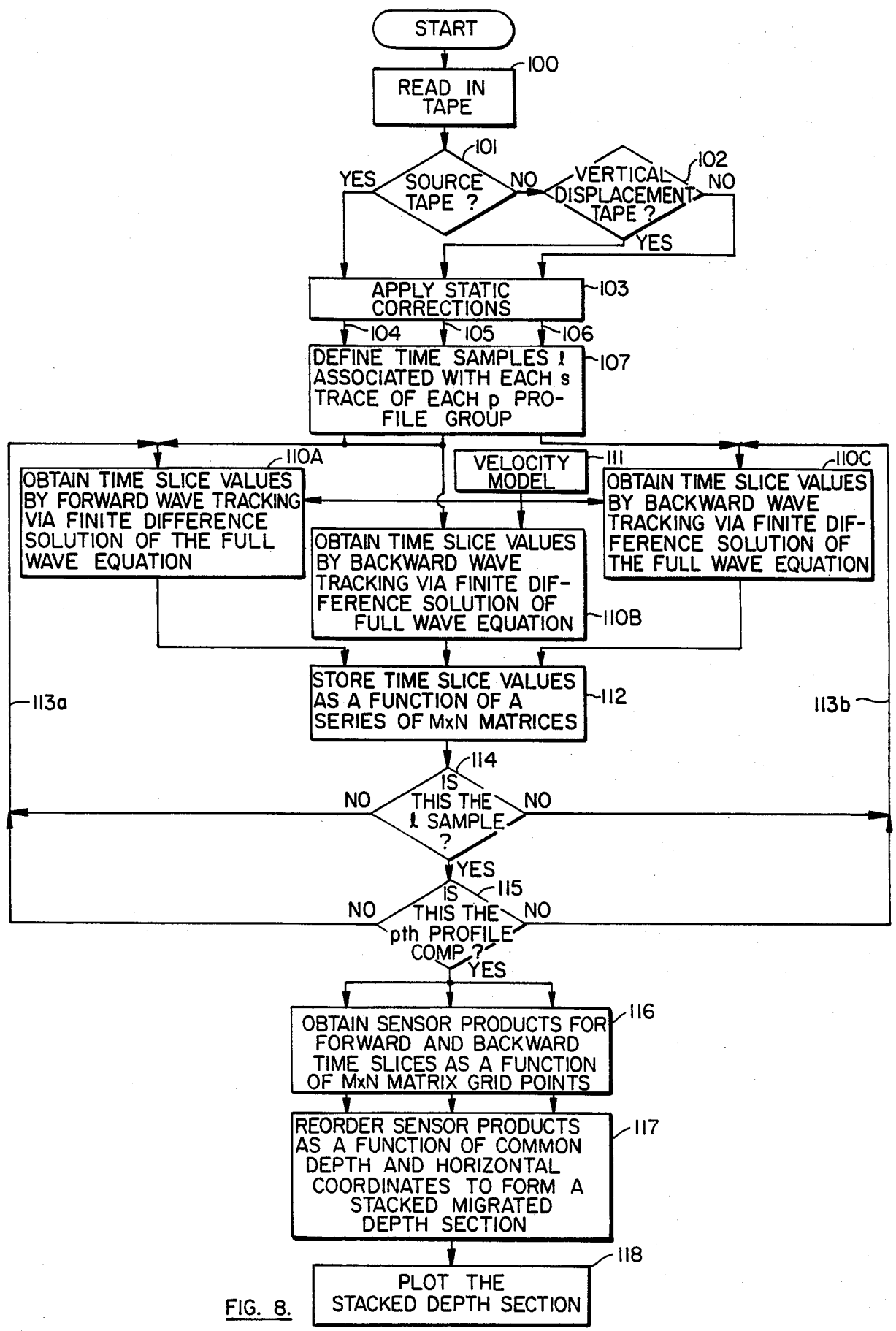
FIG. 8 is a flow chart illustrating migration steps for obtaining a fully migrated section using full-wave equations in accordance with the present invention.

FIG. 8 illustrates migration of a series of field and source traces in accordance with the present invention. It represents an overall viewpoint.

In FIG. 8 the flow chart sets forth the desired sequence of steps controlling the operation of a digital computer, to achieve the desired result of migration in order to provide seismic signals of greater intelligibility and clarity for geophysical interpretation. The flow chart sets forth the steps in sufficient detail to enable a programmer of ordinary skill in the signal processing art to program a computer in a conventional programming language such as FORTRAN in accordance with the present invention. While a conventional digital computer could be used, such as an IBM Model 3033, the present invention has been found to have a symbiotic relationship when used with modern vector-based computing systems, such as the Cray I computer, made by the Cray Corporation, Minneapolis, Minn. The vector-based architecture of such machines speed operations since the time-space differentials of the elastodynamic equations of elastic wave propagation in P-wave and S-wave environments, are themselves defined by vector properties, see Equations 21-33, supra for example. Hence, evaluation of such terms is speedily provided since computations can be carried out in simultaneous, parallel fashion.

(In this regard, the term "vector quantity" is defined as having direction, magnitude and sense and which can be expressed graphically as a line segment referred to other coordinate line segments.)

Figure 9:
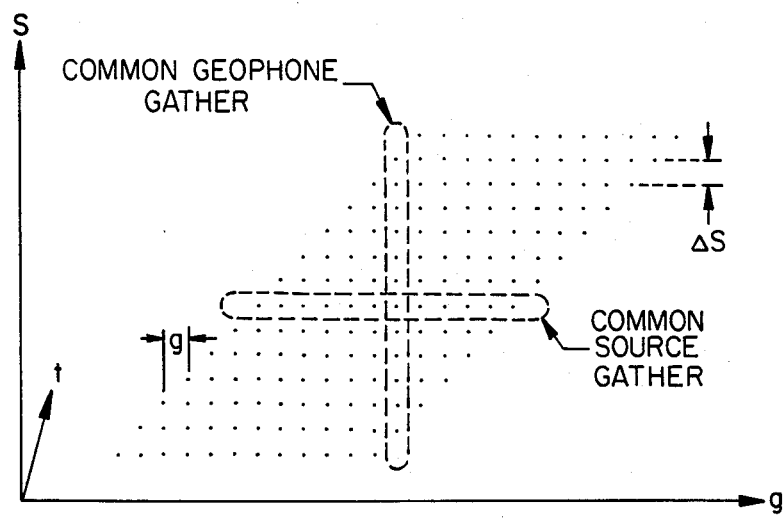
FIG. 9 is a stacking chart illustrating principles by which field traces can be reformatted and stacked to improve resolution.

Instruction 100 identifies the data to be processed as well as provides the requisite input parameter to control the system. In this regard, FIG. 9 is of interest which shows that each trace to be migrated has an s-coordinate corresponding to the location of the center of the source group giving rise to a trace and a g-coordinate corresponding to the location of the center of the geophone group whose output is the trace in question. In other words, FIG. 9 is a plot of the s- and g-coordinates of all of the traces comprising a seismic line. The location of the origin of the seismic line on the diagram is at g=s=0. The independent variable is time perpendicular to the plane of the FIG. The example shown in FIG. 9 is a seismic line consisting of 14 12-trace seismograms, or common source-group gathers, which were recorded with an end-on layout geometry. The offset of the source group center from the near geophone array center for any seismogram is as shown.

Returning now to the description of the migration of the traces of a common-geophone-group gather, it should be apparent from the transformation coordinates of FIGS. 1 and 9 what is intended.

All the traces having the same profile, are to be processed initially by the method of FIG. 8 to obtain "wave tracked" forward and backward time slices as a function of a series of horizontal and depth coordinates set on a series of rectangular matrices.

Finally, coherence between the forward migrated waves (from the source(s)) and the backward migrated waves (from the receiver(s)) is determined. Basis of coherence: correlation tensor cross-products of the wave fields at various matrix points. I.e., where a cross-product occurs (i.e., an image is formed), the resulting product can be indexed to a given grid point and stored. Ultimately all such stored products can be reordered as a function of common geophone gather coordinates and then stacked to form the final seismic depth section.

In more detail, instruction 100 causes the system to read in the record traces to be migrated in accordance with requisite input parameters used to control the system operations. The input parameters include the following:

L = the number of time samples per field trace;

P = the number of profile(s) of each field record;
S = the number of trace(s) per profile;
$T_1 \ldots T_L$ = the number of time slices common to groups of profiles.

After the decisional steps at 101 and 102 in FIG. 8, have been determined and static corrections have been applied (via general instruction 103), three streams of data 104, 105 and 106 impinge upon instruction 107 where each is reordered as a series of time samples $T_1 \ldots T_L$ and passes to a respective instruction 110A, 110B or 110C.

At instruction 110A, the source wave data sample(s) $T_1 \ldots T_L$ (since the source is redundant only, one sample may be involved), are tracked via the full-wave elastodynamic equations of propagation in P-wave and S-wave environments (set forth above) down through a series of rectangular matrices associated with different (but sequentially occurring) time samples also normalized to the activation of the source, say from the surface depth $z = 0$ to some arbitrary depth $z = z_L$ using a velocity model of predetermined character via instruction 111. This series of steps is akin to those schematically shown in FIG. 4.

At instruction 110B and 110C similar wave reconstructions occur, for example, as a function of sample time $T_1 \ldots T_L$, velocity, horizontal coordinate and depth z. Such steps are very similar to those set forth in FIG. 5 as well as similar to the prior discussions about instruction 110A, supra, except that the elastodynamic full-wave equations in P-wave and S-wave environments are normalized to the particular wave response involved, either P- or S-wave and the time slice values are marched backward in time on an equi-paced, time-step basis, i.e., the profile traces are normalized to the time of source activation, and then the individual samples of the traces of the data stream 105 are addressed along common time slices.

The relationship between the full-wave elastodynamic equations in P-wave and S-wave environments set forth above and the separate data streams is as follows:

DATA STREAM 104: Operations are in accordance with
Equations (9-15);
DATA STREAM 105: Manipulations are via Equations (9-11; 16-19); and
DATA STREAM 106: Operations via Equations (9-11; 16-19).

Next, instruction 112 assumes command and causes the time slice values to be stored as a function of horizontal and depth coordinates on the series of 2-d matrices previously discussed with regard to FIGS. 4, 5 and 6.

Iteration next occurs via loops 113A and 113B via decisional instructions 114 and 115. In more detail decision instruction 114 is seen in FIG. 8 to increment the process as a function of number of samples per source/receiver trace. While decisional instruction 115 iterates as a function a series of profile groups until the pth profile group has been processed.

During processing using loops 113A and 113B, the time samples via the full-wave elastodynamic equations of propagation in P-wave and S-wave environments are in effect tracked down through the matrices as previously discussed. At such matrix, it is known that the time samples must be time and space initialized as previously described using the terms "Cauchy's problem", "Dirichlet conditions" and "Neuman conditions".

These terms are important in understanding the steps carried out in accordance with the method aspects of the present invention and are briefly discussed below.

INITIAL CONDITIONING VIA FIG. 8

Cauchy's problem relates to the representation of elastic wave propagation in time and space coordinates and has equivalency in the solution of so-called initial-value problems by difference approximations to differential equations, see, e.g., "Difference Methods for Initial Value Problems", Robert D. Richmyer et al, John Wiley and Sons, New York 1967.

The attributes of the Cauchy's problem are as follows: it relates to a time-revolving problem reducible to an second-order ordinary differential equation, by using Fourier transforms for the spatial operators. For example, if the wave equation is expressed as $$\frac{\partial^2 U}{\partial^2 t} = \frac{\partial^2 U}{\partial x^2} + \frac{\partial^2 U}{\partial y^2} \tag{34}$$

then equation (34) can be reduced to an ordinary differential equation using the Fourier transforms $U(x,y) \to \tilde{U}(K_x, K_y)$, such as $$\tilde{U}(K_x, K_y) = \int_{-}^{+} \int_{\infty}^{\infty} U(x,y) \exp(K_x x + K_y Y) dx d2 \tag{35}$$

resulting in the generation of an ordinary differential equation of the form $$\frac{d^2 \tilde{U}}{dt^2} + (K_x^2 + K_y^2) \tilde{U} = 0 \tag{36}$$

Equation (36) can be solved by specifying initial values, i.e., Cauchy conditions. Since this equation (36) is second order, two sets of initial values must be specified, i.e., $$\tilde{U}|_{t=0} = f(K_x, K_y) \tag{37}$$

and $$\frac{d\tilde{U}}{dt}\bigg|_{t=0} = g(K_x, K_y) \tag{38}$$

after specifying f and g via Equations (37) and (38), Equation (36) can then be integrated to give a solution over the entire (t, Kx, Ky) domain. Thus, in the contest of the above equations, the Cauchy's conditions (for a wave equation) is known to provide a stable solution. This is not true however, if similar initial-value approach is used for a potential equation (i.e., elliptic operator equation):

$$\frac{\partial^2 U}{\partial X^2} + \frac{\partial^2 U}{\partial Y^2} + \frac{\partial^2 U}{\partial Z^2} = 0 \tag{39}$$

This equation again can be reduced to an ordinary differential equation using the Fourier transform $U(x, y) \to \tilde{U}(K_x, K_y)$ yielding as before.

$$\frac{d^2\tilde{U}}{dZ^2} - (K_x^2 + K_y^2)\tilde{U} = 0 \tag{40}$$

The only difference between Equation (40), supra, and the prior like equation (i.e., Equation (38)) is the minus sign before the parenthesis. Because of this change of sign, the latter equation (i.e. Equation (40)) cannot be solved stably anymore using the previous conditions, i.e., Equations (37) and (38). A stable solution can be provided, however, by specifying two additional sets of conditions, called
Dirichlet boundary conditions $$\tilde{U}\bigg|_{z=z_1} = f \tag{41}$$

$$\tilde{U}\bigg|_{z=z_2} = g$$

and Neuman boundary conditions:

$$\frac{d\tilde{U}}{dz}\bigg|_{z=z_1} = f \tag{42}$$

$$\frac{d\tilde{U}}{dz}\bigg|_{z=z_2} = g \tag{43}$$

or Mixed conditions:

$$\tilde{U}\bigg|_{z=z_1} = f \tag{44}$$

$$\left|\frac{d\tilde{U}}{dz}\right|_{z=z_2} = g \tag{45}$$

The important point is that f and g are specified at different points along the Z axis. As long as they are specified at different points, the above three combinations of boundary values give a stable solution. If f and g are specified at the same point along the Z axis, as they are in Cauchy's problem, they lead to an unstable solution. Therefore, it is said that Cauchy's problem (or Cauchy's condition) for elliptic equation is ill-posed, i.e., results in an unstable solution.

IMAGING VIA FIG. 8

Returning to FIG. 8, instructions 116 and 117 assume command for the purpose of imaging the data of each matrix into a coherent display. In more detail, instruction 116 provides tensor products associated with the forward and backward migrated waves and stores such products as a function of corresponding horizontal and depth coordinates of the series of rectangular matrices previously described. That is to say, instruction 116 simultaneously productizes the points of both matrices, that are associated with the forward and backward reconstructed waves. If there happens to be a match of reconstructed waves at a particular matrix point, the instruction 116 makes note of that fact by indexing the tensor product with the particular matrix coordinate. The search is then continued.

Next, instruction 117 assumes command and reorders the data so as to allow the previously provided tensor values to be stacked as a function of horizontal and depth coordinates.

Finally, instruction 118 assumes command and plots the stacked tensor products produce a fully migrated, enhanced horizontal and depth section.

EXAMPLES

Figure 10:
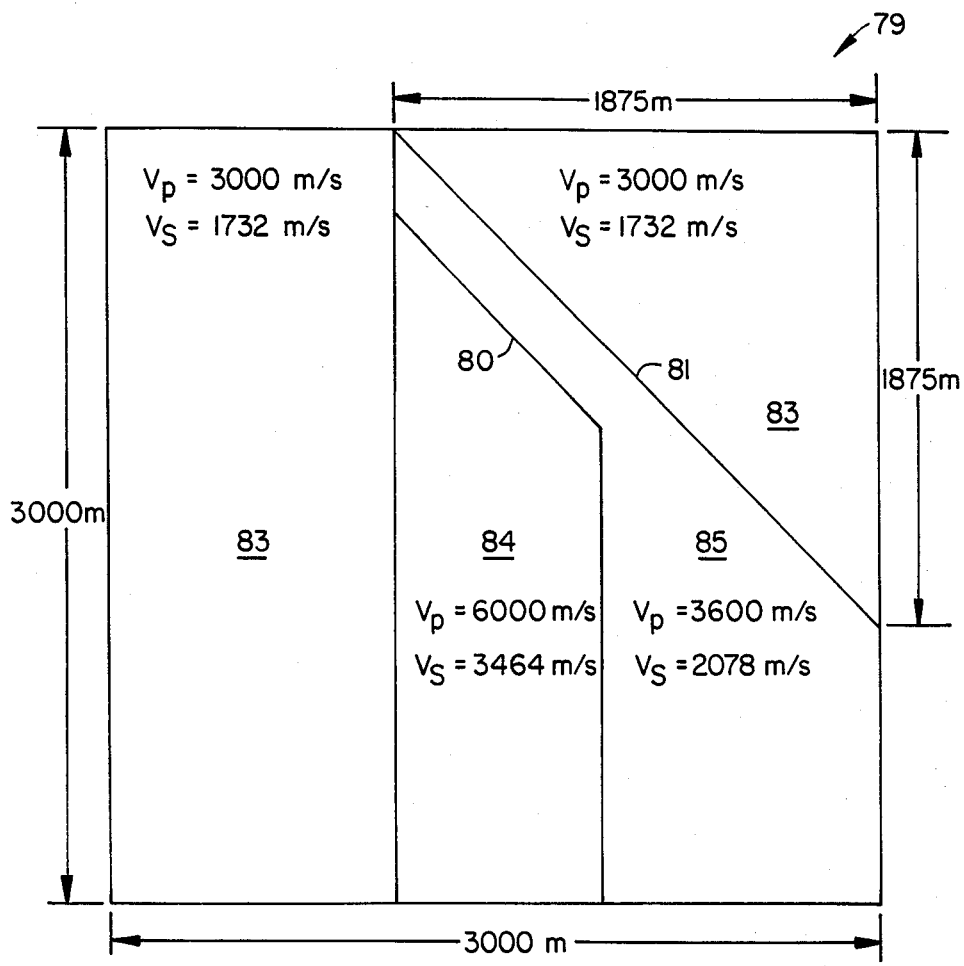
FIGS. 10-14 illustrate the development and display of field data (from a depicted model of FIG. 10) through to fully migrated displays of that data in accordance with the processing principles of the method of the present invention.

As a numerical example, synthetic elastic wave fields were generated using the wave tracking algorithm of the present invention in the forward mode in accordance with a known model and then migrate to obtain the original model structure. To show the general applicability of the algorithm in which there are no limitations as to the angle of reflectors, a rather extreme structural model 79 of FIG. 10 was used. Note two 45° reflectors 80 and 81 are evident; three velocity changes, viz. sections 83, 84 and 85, are also shown. These are carefully constructed in actual practice based on known well data or its equivalent.

For gathering source data, sources were assumed to be vertical (P-wave) or horizontal (S-wave). Impulsive generators were assumed to generate Delta function impulses only. By retaining one component of the recorded data which is perpendicular (P-wave) the component of the source and putting the other component to zero, migration of converted wave field data, which are shown in subsequent figures, is easily achieved.

Figure 11:
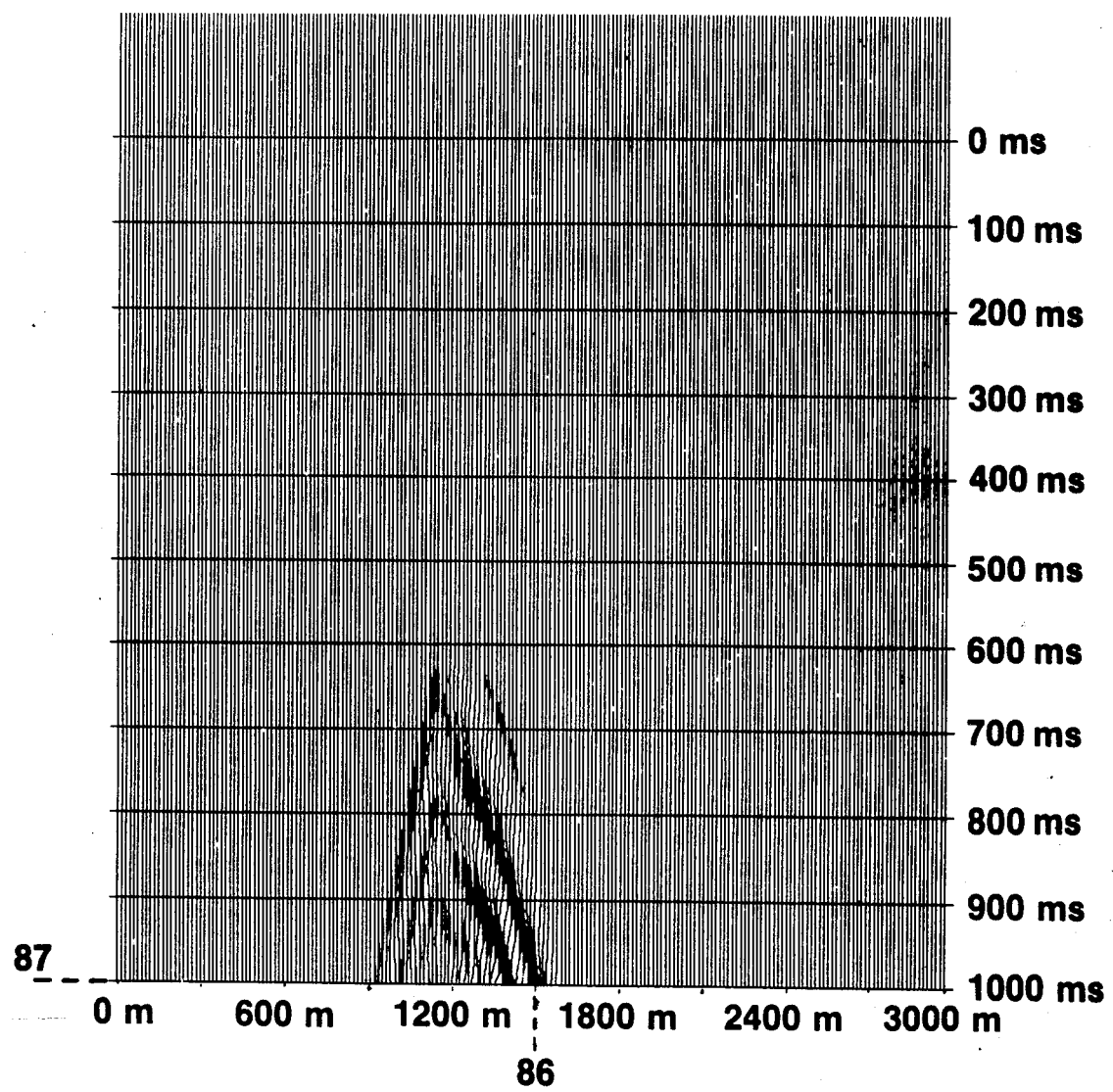
Figure 12:
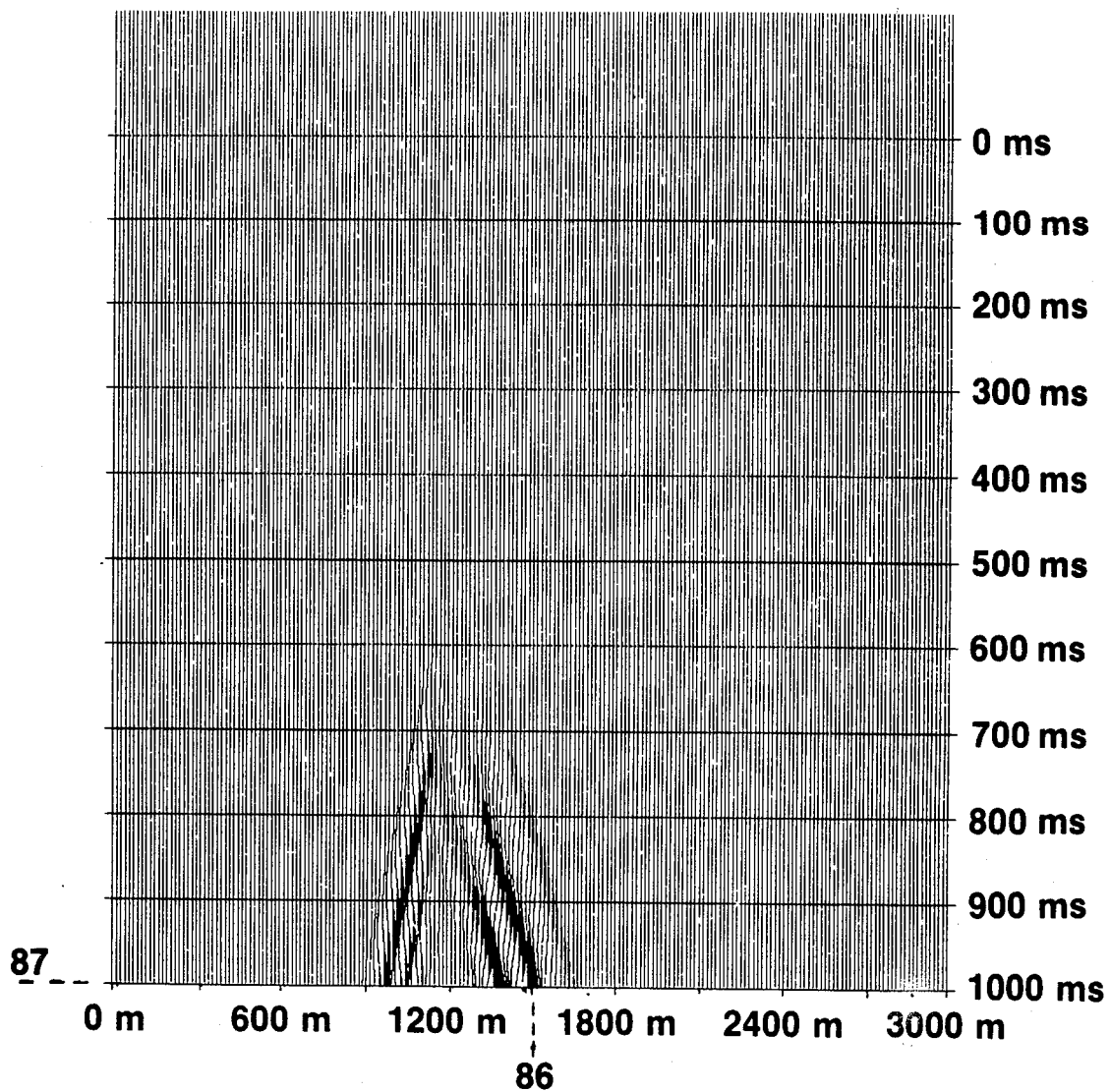

FIG. 11 and FIG. 12 illustrate vertical (P-wave) and horizontal (S-wave) component records associated with common shot gathers (see FIG. 9). The vertical source was assumed to be located at center coordinate 86; with 200 receivers located along surface 87. To simulate noisy data, a rather coarse grid spacings was used; also a high frequency source function was used in the forward synthesis.

Figure 13:
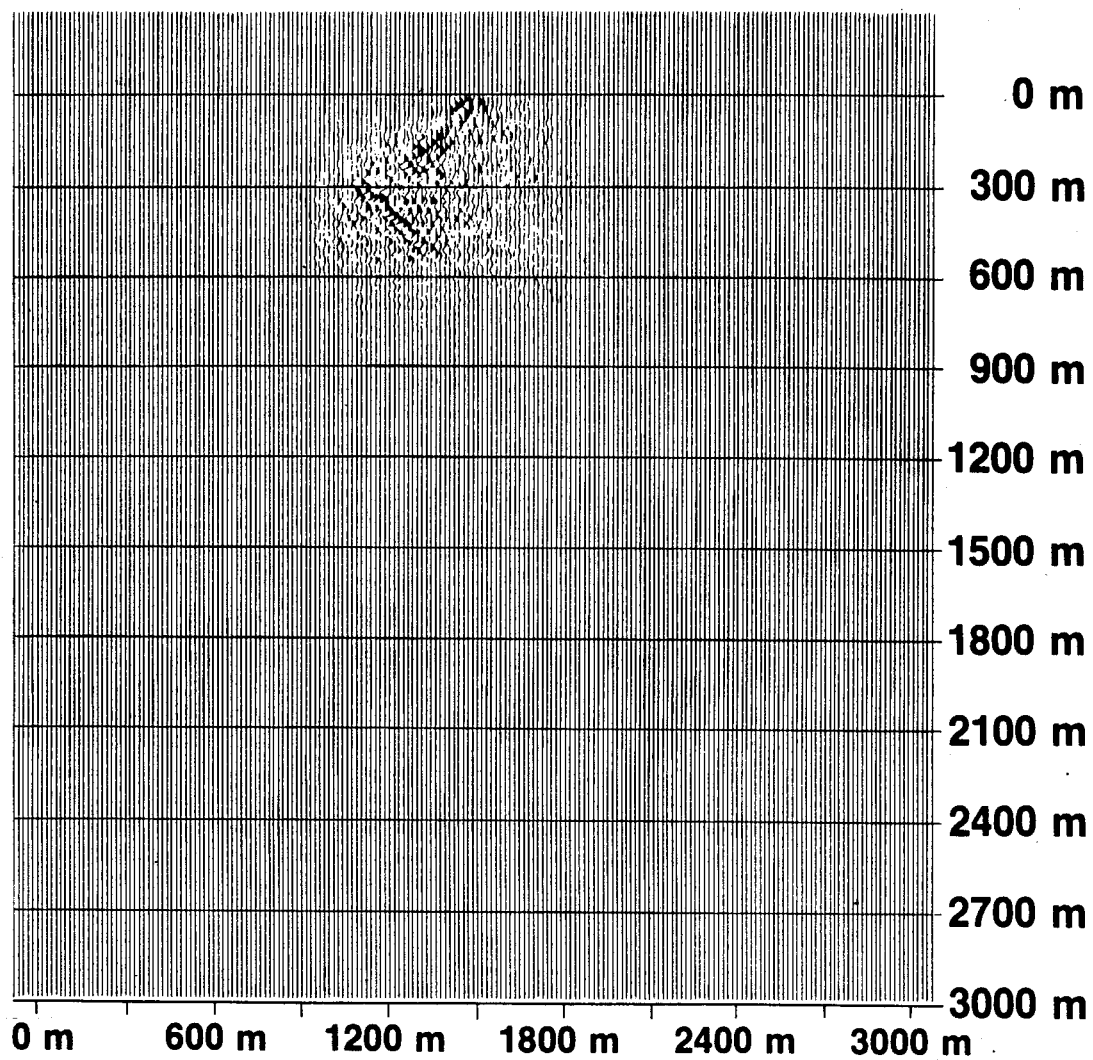

FIG. 13 illustrates the migrated section obtained by migrating the records of FIGS. 11 and 12 followed by stacking. It consists of twenty-one (21) migrated common source gathers.

Figure 14:
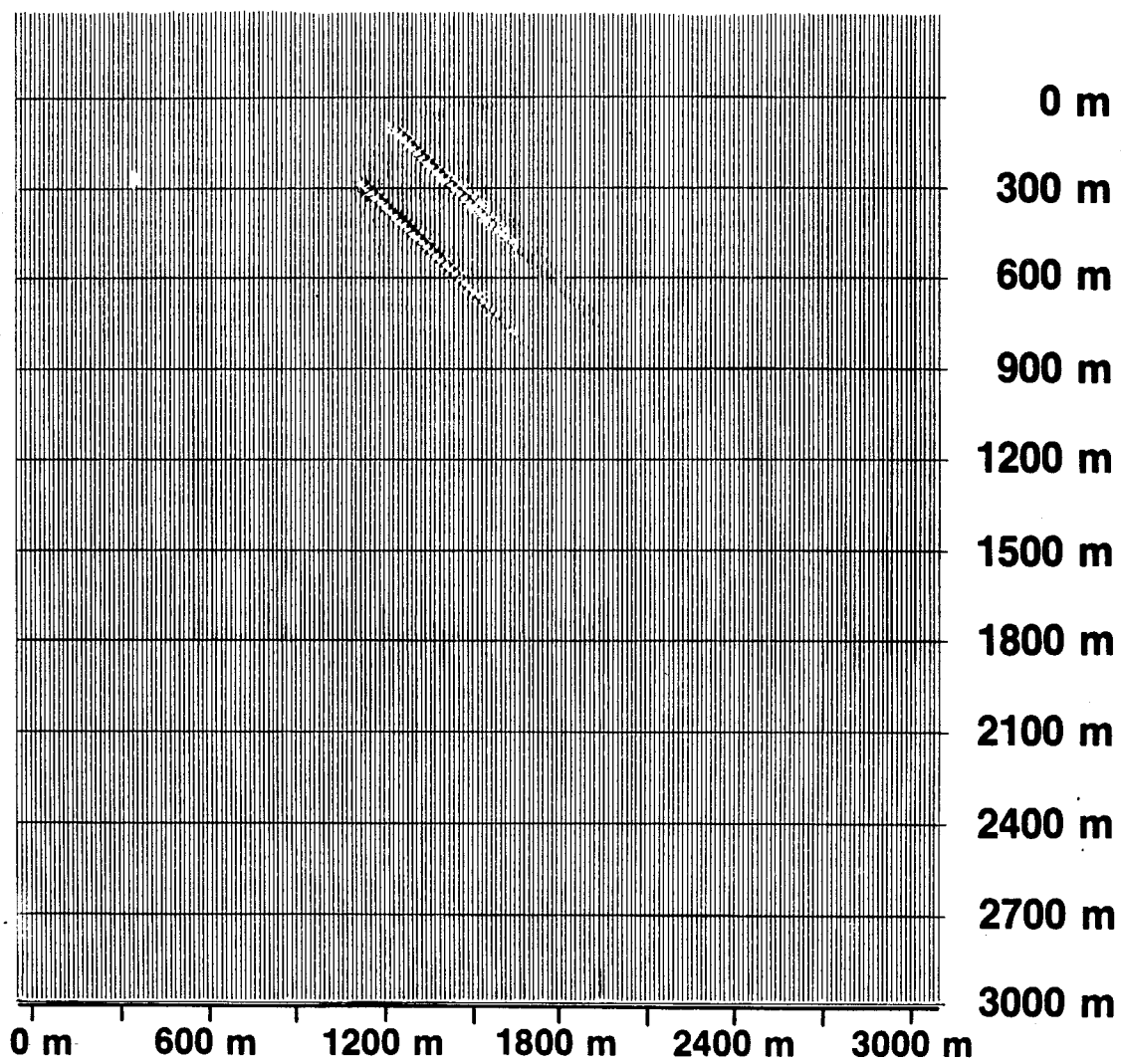

FIG. 14 shows a migrated section, on the other hand, for the horizontal component of one common shot gather converted data, viz. FIG. 12, simulating the effect of P-wave to S-wave conversion at reflectors of interest. That is, FIG. 14 illustrates the applicability of the method of the present invention to migrate converted elastic data.

FIG. 14 is similar to FIG. 13; it consists of 21 migrated common source gathers.

The invention is not limited to the above combinations alone, but is applicable to other anomalous circumstances as known to those skilled in the art. It should thus be understood that the invention is not limited to any specific embodiments set forth herein, as variations are readily apparent. Thus, the invention is to be given the broadest possible interpretation within the terms of the following claims.

What is claimed is:

1. Method for converting collected sets of P- and S-wave seismic time records each consisting of a plurality of amplitude v. time traces, into depth sections each consisting of a plurality of amplitude v. depth traces so that events on the time sections are migrated both vertically and horizontally into correct positions on the depth sections corresponding to the actual spatial positions of the reflectors in the subsurface irrespective of reflector dip, lateral velocity variation, or P- to S-wave conversion or vice versa) as well as without the need to undergo forward and inverse time-frequency transformations, (i) generating seismic field data including at least a set of P- and S-wave records, by positioning and employing an array of sources and multi-component detectors such that P- and S-wave traces comprising said collected set of P- and S-wave records can be redundantly indexed to sourcepoint-detector coordinates along a known line of survey, each P- and S-wave trace being associated with a particular source-detector pair from which said P- or S-wave trace was ultimately created;

(ii) for a particular P- and S-wave set associated with the same sourcepoint coordinate corresponding to source location through which said particular P- and S-wave set was ultimately derived establishing a sourcewave amplitude v. time signature trace therefor;

(iii) statistically correcting said sets of records of step (i) and said source trace of step (ii) to relate said field coordinates to a common horizontal datum plane;

(iv) for said particular set of P- and S-wave records and said source trace associated with said selected sourcepoint coordinate of step (ii), forming the time and space derivatives of a full-wave elastodynamic equation of wave propagation associated with said seismic source trace, and with P- and S-wave set to generate one or more elastic wave fields each of which being correct in time in one of a forward and backward direction;

(v) tracking and evaluating said time and space derivatives associated with said source signature trace and said P-wave and said S-wave traces wherein tracking of each wave field of such traces is down through a series of two-dimensional matrices representing common depth (z) and common horizontal (x) coordinates, but each matrix differing from its neighbor in incremental time value chosen in one of a forward and a backward timed sequence, said field tracking at any single matrix taking into account wave time-space estimates at at least two neighboring matrices;

(vi) searching the matrices of the evaluated forward and backward migrated wave fields to identify spatial and time coherence therebetween and then storing a representation of such coherence as a function of said field and depth coordinates of step (v), whereby said P-wave and S-wave fields v. depth sections can be formd irrespective of reflector dip.

2. Method of claim 1 in which steps (v) and (vi) includes the sub-steps of:

(a) obtaining stacked representations of common depth coordinates and common horizontal coordinates together; and (b) plotting the stacked representations to form said P-wave and S-wave field v. depth sections without the need of forward and wave time-frequency transformations.

3. Method of claim 1 in which step (v) is carried out in conjunction with a velocity model of predetermined character carefully constructed to avoid generation of multiples and to take into account lateral variations in velocity as a function of horizontal coordinate (x) whereby highly accurate depth sections can be generated.

4. Method of claim 1 in which the time-space derivatives are determined in the time domain by augmenting said full-wave elastodynamic equation to form a series of elastodynamic equations of the form:

$$\frac{U_{i,j}^{n+1} - 2 U_{i,j}^n + U_{i,j}^{n-1}}{\Delta t^2} = \alpha_{i,j}^2 \left( \frac{U_{i+1,j}^n - 2 U_{i,j}^n + U_{i-1,j}^n}{\Delta h^2} \right) + \quad (I)$$

$$(\alpha_{i,j}^2 - \beta_{i,j}^2) \left( \frac{V_{i+1,j+1}^n + V_{i-1,j-1}^n - V_{i-1,j}^n - V_{i,j-1}^n}{\Delta h^2} \right) +$$

$$\beta_{i,j}^2 \left( \frac{U_{i,j+1}^n - 2 U_{i,j}^n + U_{i,j-1}^n}{\Delta h^2} \right)$$

$$\frac{V_{i,j}^{n+1} - 2 V_{i,j}^n + V_{i,j}^{n-1}}{\Delta t^2} = \alpha_{i,j}^2 \left( \frac{V_{i,j+1}^n - 2 V_{i,j-1}^n + V_{i,j-1}^n}{\Delta h^2} \right) + \quad (II)$$

$$(\alpha_{i,j}^2 - \beta_{i,j}^2) \left( \frac{U_{i+1,j}^n + U_{i,j+1}^n - U_{i-1,j}^n - U_{i,j-1}^n}{\Delta h^2} \right) +$$

$$\beta_{i,j}^2 \left( \frac{V_{i+1,j}^n - 2 V_{i,j}^n + V_{i-1,j}^n}{\Delta h^2} \right)$$

$$\alpha_{i,j} = \sqrt{\frac{\lambda_{i,j} + 2 \mu_{i,j}}{\rho_{i,j}}} \quad (III)$$

and $$\beta_{ij} = \sqrt{\frac{\mu_{i,j}}{\rho_{i,j}}} \quad (IV)$$

where
U is a horizontal component of the displacement or so-called S-wave displacement vector;
x is a horizontal coordinate;
Z or Y is a vertical coordinate;
i is the grid point number in the x direction;
j is the grid point number in the z direction;
n is the time step number;
$\Delta h$ is the grid spacing;
$\Delta t$ is the increment of time at each time step;
V is a vertical component of displacement, or so-called P-wave displacement vector;
$\alpha$ is the P-wave Velocity;
$\beta$ is the S-wave Velocity;

$\left. \begin{array}{c} \lambda \\ \mu \end{array} \right\}$ are Lame's parameters
$\rho$ is the density.

5. Method of claim 4 in which said elastodynamic equation of wave propagation for the source field is evaluated in a forward time sequence and has boundary and initial conditions determined in accordance with:

$$U_{i,j}^n = V_{i,j}^n = 0 \quad | \; i,j \text{ on the boundaries other than the} \quad (V)$$

-continued
the surface of interest $$U_{i,j}^n = V_{i,j}^n = 0 \quad | \; n < 0 \quad \text{(VI)}$$

$$U_{i,j}^n = f_{i,j}^n \quad | \; n \geq 0, \; i,j \text{ on the surface} \quad \text{(VII)}$$

$$V_{i,j}^n = g_{i,j}^n \quad | \; n \geq 0, \; i,j \text{ on the surface} \quad \text{(VIII)}$$

where f and g represent field source data.

6. Method of claim 4 in which said elastodynamic equations of wave propagation for the P- and S-wave fields are evaluated in a backward time sequence and have boundary and initial conditions determined in accordance with:

$$U_{i,j}^n = V_{i,j}^n = 0 \quad | \; i,j \text{ on the boundaries other than the surface} \quad \text{(IX)}$$

$$U_{i,j}^n = V_{i,j}^n = 0 \quad | \; n > T_o \quad \text{(X)}$$

$$U_{i,j}^n = f_{i,j}^n \quad n \leq T_o, \; i,j \text{ on the surface} \quad \text{(XI)}$$

$$V_{i,j}^n = g_{i,j}^n \quad | \; n \leq T_o, \; i,j \text{ on the surface} \quad \text{(XII)}$$

where, in addition, f and g represent the P- and S-wave data; To is the time of the last record and t is the incremental time step.

7. Method for converting collected P- and S-wave seismic time records each consisting of a plurality of amplitude v. time traces, into depth sections each consisting of a plurality of amplitude v. depth traces so that events on the time sections are migrated both vertically and horizontally into correct positions on the depth sections corresponding to the actual spatial positions of the reflector in the subsurface irrespective of reflector dip, lateral velocity variation, or P- to S-wave conversion or vice versa) as well as without the need to undergo forward and inverse time-frequency transformations;

(i) generating seismic field data including at least said P- and S-wave records comprising a series of P- and S-wave traces, respectively, by positioning and employing an array of sources and multi-component detectors such that said P- and S-wave traces can be redundantly indexed to source-point-detector coordinates along a known line of survey, each P- and S-wave trace being associated with a particular source-detector pair from which said particular P- or S-wave trace was ultimately derived;

(ii) for particular P- and S-wave records associated with the same sourcepoint coordinate, establishing sourcewave amplitude v. time signature data therefor;

(iii) statistically correcting said records and source data to relate said field coordinates associated therewith to a common horizontal datum plane;

(iv) for said particular P- and S-wave records and said source data associated with said selected sourcepoint coordinate of step (iii) forming the time and space derivatives of full-wave elastodynamic equations of wave propagation associated with said seismic source signature, and with said particular P- and S-wave records to generate one or more elastic wave fields each of which being correct in time in one of a forward or backward direction;

(v) tracking and evaluating said time and space derivatives associated with said source signature data and P-wave and S-wave field data of said records, wherein tracking of each of such field data is down through a series of two-dimensional matrices representing common depth (z) and horizontal coordinates (x) but each matrix differing from its neighbor in incremental time values chosen in one of a forward and backward timed sequence, said field tracking at any single matrix taking into account wave time-space estimates at at least two neighboring matrices;

(vi) searching the matrices of the evaluated forward and backward migrated wave fields to identify spatial and time coherence therebetween, and then plotting a representation of such coherence as a function of said field and depth coordinates of step (v), whereby said P-wave and S-wave field v. depth sections can be formed irrespective of reflector dip.

8. Method of claim 7 in which steps (v) and (vi) include the substeps of
   (a) obtaining stacked representations of common depth coordinates and common horizontal coordinates together, and then
   (b) plotting the stacked representations to form said P-wave and S-wave field v. depth sections without the need of forward and wave time-frequency transformations.

9. Method of claim 7 in which step (v) is carried out in conjunction with a velocity model of predetermined character carefully constructed to avoid generation of multiples and to take into account lateral variations in velocity as a function of horizontal coordinate (x) whereby highly accurate depth sections can be generated.

10. Method of claim 7 in which the time-space derivatives of the said elastodynamic equations of wave propagation is in accordance with $$\frac{U_{i,j}^{n+1} - 2U_{i,j}^n + U_{i,j}^{n-1}}{\Delta t^2} = \alpha_{i,j}^2 \left( \frac{U_{i+1,j}^n - 2U_{i,j}^n + U_{i-1,j}^n}{\Delta h^2} \right) + \quad \text{(I)}$$

$$(\alpha_{ij}^2 - \beta_{ij}^2) \left( \frac{V_{i+1,j+1}^n + V_{i-1,j-1}^n - V_{i-1,j}^n - V_{i,j-1}^n}{\Delta h^2} \right) +$$

$$\beta_{i,j}^2 \left( \frac{U_{i,j+1}^n - 2U_{i,j}^n + U_{i,j-1}^n}{\Delta h^2} \right)$$

$$\frac{V_{i,j}^{n+1} - 2V_{i,j}^n + V_{i,j}^{n-1}}{\Delta t^2} = \alpha_{i,j}^2 \left( \frac{V_{i+1,j}^n - 2V_{i,j}^n + V_{i-1,j}^n}{\Delta h^2} \right) + \quad \text{(II)}$$

$$(\alpha_{i,j}^2 - \beta_{i,j}^2) \left( \frac{U_{i+1,j}^n + U_{i,j+1}^n - U_{i-1,j}^n - U_{i,j-1}^n}{\Delta h^2} \right) +$$

$$\beta_{i,j}^2 \left( \frac{V_{i+1,j}^n - 2V_{i,j}^n + V_{i-1,j}^n}{\Delta h^2} \right)$$

$$\alpha_{i,j} = \sqrt{\frac{\lambda_{i,j} + 2\mu_{i,j}}{\rho_{i,j}}} \quad \text{(III)}$$

and

-continued $$\beta_{ij} = \sqrt{\frac{\mu_{i,j}}{\rho_{i,j}}} \quad \text{(IV)}$$

where
- U is a horizontal component of displacement or so-called S-wave displacement vector;
- x is a horizontal coordinate;
- Z or Y is a vertical coordinate;
- i is the grid point number in the x direction;
- j is the grid point number in the z direction;
- n is the time step number;
- $\Delta t$ is the time increment;
- $\Delta h$ is the grid spacing;
- V is a vertical component of displacement, or so-called P-wave displacement vector;
- $\alpha$ is the P-wave Velocity;
- $\beta$ is the S-wave Velocity;

$\left.\begin{array}{c}\lambda \\ \mu\end{array}\right\}$ are Lame's parameters
$\rho$ is the density.

11. Method of claim 10 in which said elastodynamic equations of wave propagation for the source field are evaluated for boundary and initial conditions in accordance with $U_{i,j}^n = V_{i,j}^n = 0 \quad | \; i,j$ on the boundaries other than the surface of interest $\quad$ (V)

$U_{i,j}^n = V_{i,j}^n = 0 \quad | \; n < 0 \quad$ (VI)

$U_{i,j}^n = f_{i,j}^n \quad | \; n \geq 0, \; i,j$ on the surface $\quad$ (VII)

$V_{i,j}^n = g_{i,j}^n \quad | \; n \geq 0, \; i,j$ on the surface $\quad$ (VIII)

where f and g represent field source data.

12. Method of claim 10 in which said elastodynamic equations of wave propagation for the P- and S-wave field are evaluated for boundary and initial conditions in accordance with $U_{i,j}^n = V_{i,j}^n = 0 \quad | \; i,j$ on the boundaries other than surface of interest $\quad$ (IX)

$U_{i,j}^n = V_{i,j}^n = 0 \quad | \; n > T_o \quad$ (X)

$U_{i,j}^n = f_{i,j}^n \quad | \; n \leq T_o, \; i,j$ on the surface $\quad$ (XI)

$V_{i,j}^n = g_{i,j}^n \quad | \; n \leq T_o, \; i,j$ on the surface $\quad$ (XII)

where f and g represent the P- and S-wave data; $T_o$ is the time of the last record; and t is the incremental time step.

13. Method of claim 10 in which said time-space derivatives of said elastodynamic equations are determined by a vector-based digital computer wherein at least two computational operations for evaluation of such derivatives are carried out in parallel, simultaneous fashion.

14. Method of claim 1 in which the time-space derivatives of said full-wave electrodynamic equation of wave propagation are in accordance with:

$$\frac{\phi_{i,j}^{n+1} - 2\phi_{i,j}^n + \phi_{i,j}^{n-1}}{\Delta t^2} = \frac{1}{\Delta h^2} [(\phi_{i+1,j}^n - 2\phi_{i,j}^n + \phi_{i-1,j}^n) + (\phi_{i,j+1}^n - 2\phi_{i,j} + \phi_{i,j-1})]$$

where:
- $\phi$ is a scalar variable,
- i is an indexing number of grid points in the x direction;
- j is an indexing number of grid points in the depth direction;
- n is an indexing number in the series of time steps;
- $\Delta h$ is the spacing of the grid; and
- $\Delta t$ is the incremental time of the time steps.

15. Method of claim 14 in which the full-wave elastodynamic equation for the source field is evaluated in a forward time sequence and has boundary and initial conditions determined in accordance with:

$\phi_{i,j}^n = f_{i,j}^n \; | \; i,j$ on a boundary $\phi_{i,j}^n = g_{i,j} \; | \; n = 0$ and $\dfrac{\phi_{i,j}^{n+1} - \phi_{i,j}^n}{\Delta t} = h_{i,j} \; | \; n = 0$ where $f_{i,j}^n$, $g_{i,j}$, and $h_{i,j}$ are specified as boundary or initial conditions.

* * * * *